United States Patent
Fujisawa et al.

(10) Patent No.: US 6,348,746 B1
(45) Date of Patent: Feb. 19, 2002

(54) SLIDER UNIT WITH BUILT-IN MOVING-COIL LINEAR MOTOR

(75) Inventors: Shoji Fujisawa; Eiji Ida, both of Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/556,629

(22) Filed: Apr. 21, 2000

(30) Foreign Application Priority Data

May 18, 1999 (JP) .......................................... 11-137267

(51) Int. Cl.$^7$ .............................................. H02K 41/02
(52) U.S. Cl. .......................................... 310/12; 310/13
(58) Field of Search .............................. 310/12, 13, 14, 310/89, 91

(56) References Cited

U.S. PATENT DOCUMENTS

| | | | | |
|---|---|---|---|---|
| 4,247,794 A | * | 1/1981 | Jooss et al. ................. | 310/13 |
| 4,318,038 A | * | 3/1982 | Munehiro ..................... | 310/13 |
| 4,916,340 A | * | 4/1990 | Negishi ........................ | 310/12 |
| 5,130,583 A | * | 7/1992 | Andoh .......................... | 310/12 |
| 5,359,245 A | * | 10/1994 | Takei ........................... | 310/12 |
| 5,732,917 A | | 3/1998 | Chitayat ....................... | 310/12 |
| 5,808,381 A | | 9/1998 | Aoyama et al. ............... | 310/12 |
| 5,825,104 A | | 10/1998 | Kondo et al. ................. | 310/12 |
| 5,831,352 A | * | 11/1998 | Takei ........................... | 310/12 |

FOREIGN PATENT DOCUMENTS

| | | |
|---|---|---|
| EP | 0949 749 A1 | 10/1999 |
| JP | 68365/1993 | 3/1993 |

* cited by examiner

*Primary Examiner*—Tran Nguyen
(74) *Attorney, Agent, or Firm*—Browdy and Niemark

(57) ABSTRACT

Disclosed a slider unit having built-in a moving-coil linear motor made compact in construction by the provision of an improved magnet yoke for supporting field magnets, which is made in a slim construction, nevertheless very high in stiffness. The magnet yoke is comprised of a pair of confronting webs and a connecting web to connect integrally the confronting webs to each other. The magnet yoke of such integral construction helps ensure the overall high stiffness despite the webs being made thin. Thus, the magnet yoke may be made considerably slim, compared with the prior magnet yoke in which the confronting webs and connecting web are produced individually. A moving-coil assembly is installed to a table movable in a sliding manner through linear motion guide units with respect to a stationary bed.

19 Claims, 25 Drawing Sheets

F/G. 12

F I G. 33
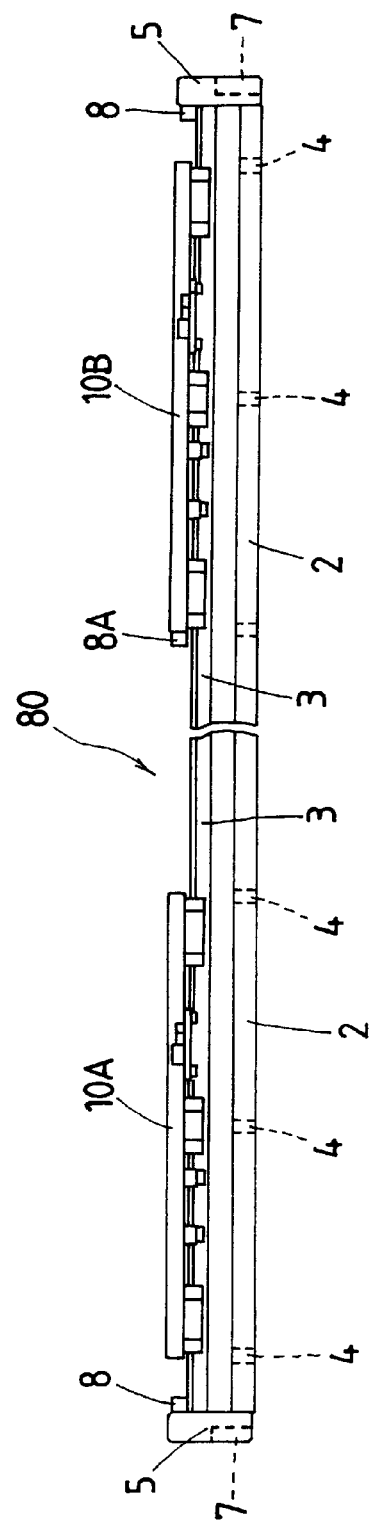

SLIDER UNIT WITH BUILT-IN MOVING-COIL LINEAR MOTOR

BACKGROUND OF THE INVENTION

1. Field of the Invention

The present invention relates to a slider unit with a built-in moving-coil linear motor, which has been extensively used in semiconductor and liquid crystal display industries, measuring instruments, assembling machines, machine tools, industrial robots, conveyors and others.

2. Description of the Prior Art

In recent years, multi-axis stages and moving mechanisms such as X-Y plotters employed in the diverse technical fields as described above have required more and more a slider unit, which is compact or slim in construction and light in weight, and moreover able to operate with high propulsion, high speed and high response to provide high speed travel and accurate position control for works, tools, articles and instruments. Linear motors commonly used in the slider units involve two broad types. The first, called moving-magnet linear motor, has a stator of an armature coil arranged lengthwise over the entire length of a bed of stationary part, and a moving-field magnet of permanent magnet arranged on a table movable in a sliding manner along the length of the bed. The second, called moving-coil linear motor, has a stator of field magnet mounted on the bed, and moving-armature coils distributed in space one after another on the table such that they lie a preselected electrical angle out of phase.

A moving-coil linear motor is disclosed in Japanese Patent Laid-Open No. 68365/1993, in which field magnets on a stator are arranged with unlike poles opposing to each other and alternating lengthwise. A slider is mounted to the stator for sliding movement through linear motion guide units. The slider is provided with a moving element having armature coils, which are distributed in space so that their magnetic axes lie 120° apart. The armature coils are applied with the currents of U-, V- and W-phases that are 120° in the electrical angle out of phase, and therefore a driving force of a desired direction may occur in the moving element by the control of the conducting direction.

Japanese Patent Laid-Open No. 311723/1994 discloses a dc linear motor and a driving unit provided with the same. In the linear motor, the armature coils are joined to the coil boards with machine screws through the intermediate assembling parts, together with the coil yokes that are provided separately to fasten the armature coils and coil boards. Thus, the linear motor is constructed with a series of motor units connected, each of which is composed of at least two armature coils, a combined coil board and circuit board allotted to the set of armature coils. The driving unit may ensure the stroke most suitable for the operating stroke by either increasing or reducing any number of the motor units connected, depending on the apparatus employing the linear motor.

Japanese Patent Laid-Open No. 38503/1994 discloses a moving-coil linear motor, in which permanent magnets are arranged such that the poles on the magnets alternate lengthwise in polarity, and a moving element is arranged for lengthwise movement. The moving element is provided with polyphase coils exposed in a magnetic gap formed on surfaces of the permanent magnets, and field detecting means to control the conducting direction to the polyphase coils. In the prior linear motor, the permanent magnets are arranged spaced apart and another permanent magnets magnetized lengthwise are alternately arranged and fixed between any adjoining first permanent magnets such that any like polarity comes near on their surfaces, thereby proving a continuous row of permanent magnets.

In addition, a moving-coil linear motor is disclosed in Japanese Patent Laid-Open No. 127037/1998, which comprises a stator of integral permanent magnet magnetized such that poles on the magnet alternate lengthwise in polarity, and a polyphase coil arranged for lengthwise movement along the permanent magnet in a magnetic gap shaped by the permanent magnets.

Japanese Patent Laid-Open No. 64487/1993 discloses a positioning table composed of a moving-magnet of permanent magnet attached to a worktable, means for detecting a position of the table, a coil for a stator made conductive depending on the position of the table, and a polyphase motor changing selectively over a conducting direction of electric current.

Moreover, Japanese Patent Laid-Open No. 300721/1993 discloses a linear motor for sliding means, in which a yoke magnet is composed of a upper plate, lower plate and connecting plate, which are prepared separately and then assembled integrally with fixing means such as machine screws. According to this prior linear motor, the parts for the yoke magnet, or the upper plate, lower plate and connecting plate, must be made great in thickness to render less the flexure that might be caused by the attractive force exerted from the opposing magnets. As a result, the sliding means becomes large in height in cross section thereof, thus failing in compactness of the entire apparatus.

For the slider unit having the moving-coil linear motor that is linearly moved together with a worktable by virtue of interaction between magnetic flux generated in a pair of field magnets arranged on confronting inside surfaces of the magnet yoke, each to each surface, and an electric current flowing through an armature coil arranged in a gap provided between the field magnets, thus, an improved linear motor has been desirable, which has the stiffness enough to withstand the attractive force due to the magnet even when the magnet yoke is made less in thickness, so that the slider unit may be made entirely slim or compact in construction and the worktable may operate with highly accurate speed and position control.

SUMMARY OF THE INVENTION

The present invention, therefore, has as its primary object to overcome the subject as described just above and more particular to provide a slider unit with a built-in moving-coil linear motor, in which driving means actuated by the moving-coil linear motor is incorporated, and a magnet yoke, despite made less in thickness, is enhanced in stiffness, thereby relieved from possible strain due to the magnetic force so that the slider unit may be reduced overall height to be made slim in construction and also makes it possible to provide accurate speed and position control.

The present invention is concerned with a slider unit with a built-in moving-coil linear motor, comprising a bed supporting thereon a magnet yoke, a table movable through linear motion guide units in a sliding manner with respect to the bed, end plates mounted to lengthwise opposing ends of the bed, each to each end, a pair of field magnets arranged on inwardly confronting surfaces of the magnet yoke in such a manner that poles on the field magnets alternate in polarity along a moving direction of the table and also unlike poles confront each other across an air gap between the field magnets, and a moving-coil assembly mounted to the table and provided with armature coils arranged in the air gap, wherein the moving-coil assembly moves together with the table by virtue of electromagnetic interaction of magnetic flux of the field magnets with current flowing in the armature coils, the magnet yoke is composed of a pair of confronting sections having thereon the field magnets, each to each section, and a connecting section to join the confronting sections to each other at their lengthwise edges extending along the moving direction of the table, and the moving-coil assembly extends into the air gap, with passing through a sidewise opening formed at another edges of the confronting sections extending along the moving direction of the table.

In accordance with an aspect of the present invention, the connecting section is formed integrally with the confronting sections. Moreover, it is preferable that both the table and the bed are made of aluminum alloys.

In accordance with another aspect of the present invention, the bed is composed of a bottom and a pair of upright walls rising at sidewise opposing sides of the bottom and extending along the moving direction of the table, and the magnet yoke is arranged such that any one of the confronting section is mounted on the bottom while another of the confronting sections is spaced apart in substantially parallel with the bottom, with the connecting section extending in perpendicular to opposing surfaces of the confronting sections. Moreover, the table is arranged on top faces of the upright walls for sliding movement with respect to the bed through the linear motion guide units.

In accordance with another aspect of the present invention, there is provided detecting means to monitor a position of the table relative to the bed, the detecting means being installed inside any one of the upright walls of the bed, which is near the sidewise opening of the magnet yoke. In addition, the detecting means is comprised of a linear scale attached lengthwise on an inside surface of the upright wall nearby the sidewise opening of the magnet yoke, and a sensor head provided inside the table to detect the linear scale. As an alternative, the detecting means is of optical type in which the linear scale is a photo-linear scale and the sensor head is an optical sensor head.

In accordance with a further another aspect of the present invention, the table is made therein with a port to permit access to the sensor head.

In accordance with another aspect of the present invention, a slider unit is disclosed, wherein any one of the confronting sections of the magnet yoke, which is near the table, is attached to the bed, while another of the confronting sections is provided by a part of the bed and the connecting section is provided by a part of the former one of the confronting sections and a part of the bed. In the construction described just above, the table is made of aluminum alloys, whereas the bed is made of magnetic material. Moreover, the bed is composed of a bottom and a pair of upright walls rising at sidewise opposing sides of the bottom and extending along the moving direction of the table, and the former one of the confronting sections and the connecting section are provided by a part of the bottom and any one of the upright walls, while another of the confronting sections of the magnet yoke is arranged in substantially parallel with the bottom.

In accordance with another aspect of the present invention, the moving-coil assembly has a coil board extending into the air gap between the field magnets, and the armature coils are a plurality of flat polyphase structures arranged on any one surface of the coil board in juxtaposition along the moving direction of the table.

In accordance with another aspect of the present invention, the armature coils are made with convexities while the coil board has recesses complementary to the convexities, so that the armature coils are fixed to the coil board with adhesive, with the convexities fitting in the associated recesses. This construction can certainly keep the armature coils against changes or slippage in position relative to the coil board regardless of high-speed operation of the table.

In accordance with a further another aspect of the present invention, each armature coil comprises a core member of molded resinous material, and winding turns looped around the core member in the form of flat rectangular solid.

In accordance with another aspect of the present invention, the bed is provided with limiters to define a tolerable range of moving stroke of the table and an origin mark to define a home position of the table, and any one of the table and the moving-coil assembly has a limit sensor to detect the limiters and the origin mark. Monitoring the limiters and/or the origin mark allows controlling the position and/or stroke of the moving table.

In accordance with an additional aspect of the present invention, recesses for manipulation are formed at the outermost end faces of the end plates, thereby making it possible to manually operate the slider unit.

In accordance with another aspect of the present invention, stoppers of elastic body are attached to inside surfaces of the end plates to provide buffers for a collision against the table. Were the table driven over the tolerable range of the stroke in the bed, the elastic stoppers on the inside surfaces of the end plates would buffer the collision with the table to protect the slider unit against breakage.

In accordance with another aspect of the present invention, a slider unit is disclosed wherein a plurality of the tables is arranged to a single bed for sliding movement. Moreover, the adjoining tables has the stoppers of elastic material on their ends facing at least one moving direction of the tables, in order to buff impact of collision between the adjoining tables.

With the slider unit constructed as described just above, electric conduction to the armature coils causes the moving-coil assembly to slide together with the table through the linear motion guides units relatively to the bed by virtue of the electromagnetic interaction of the magnetic flux created by the field magnets with the current flowing through the armature coils.

For example, when controlling the direction of current to the armature coils depending on the direction of magnetic flux, which changes as the moving-coil assembly moves, the propulsion to force continuously the moving-coil assembly towards the desired direction comes into action and thus the table may continue to move in the desired direction. Controlling the quantity of current can realize acceleration and braking, whereas controlling the direction of current makes it possible to the travelling direction of the table. Moreover, the magnet yoke in which the confronting webs are formed integrally with the connecting web is improved considerably in rigidity or stiffness, compared with the yoke in which the confronting webs and the connecting web prepared separately are joined with mechanical fasteners, thus becoming less subject to the deflection owing to the magnetic attraction.

The magnet yoke of the present invention may contribute to saving space for combination with the moving-coil assembly and realizing effective electromagnetic interaction. Moreover, the table may be kept on steady sliding motion relative to the bed by virtue of the paired upright walls.

In a slider unit in which any one of the confronting sections of the magnet yoke is provided by a part of the bed, while the connecting section is provided by a part of another one of the confronting sections and a part of the bed, the bed high naturally in stiffness serves partially as a part of the magnet yoke and only one of the confronting sections is attached directly to the bed. This construction results in enhancing remarkably the stiffness, which might withstand the attractive force due to the magnets, thereby enabling to make less the amount of distortion of the magnet yoke, compared with the conventional magnet yoke assembled with fixing means such as screws. The magnet yoke constructed as described just above may also contribute to saving space for combination with the moving-coil assembly and realizing effective electromagnetic interaction.

The sensor means to detect information as to the positions of the table with respect to the bed is placed near the central area of the table and therefore is less subject to the adverse influence of changes in position such as pitching, yawing and rolling as the table 10 moves, so that the accurate sensing control may be realized. The sensing means is preferably made of optical type, which is more suitable for high accuracy because of relatively poor sensibility to a deviation between the table and the bed. In addition, the table is provided therein with the port for access to the sensor head to make it easy to adequately regulate the position and posture of the sensor head relatively to the linear scale. And since the sensor head is arranged nearby a moving-coil assembly, the wiring for the sensor means may be neatly arranged in a narrow area.

The moving-coil assembly composed of the coil board and flat armature coils is made as slim as possible in thickness and arranged for linear movement in the air gap between the confronting field magnets.

With the armature coils of polyphase structure, the steady electromagnetic interaction with the field magnets can be obtained regardless of the relative position of the table with respect to the bed so that the table may always move steadily.

The armature coils are fixed to and the coil board with adhesive, with the complementary convexities and recesses formed on their facing surfaces coming in engagement with one another. This assures the complete fit of the armature coils on the coil board without causing no slippage between them. Thus, the armature coils can withstand the inertia that might occur as the table moves at high speed, and also very hard to lose their form due to heating.

The core of the molded resinous material is favorable to produce the armature coil strong enough to hold up its configuration. For example, the armature coils, as less subject to deformation even under high temperature, rise in structural strength, thereby allowing higher-speed of operation than any other prior slider units.

As the slider unit, as entirely made in the elongated flat form, may be easily moved and/or carried by putting the operator's hands on the recesses formed at the outermost end faces of the end plates.

At least the table is made of aluminum alloys. This renders highly light in weight the moving side of the slider unit to obtain high acceleration and braking without considerably powerful electromagnetic prolusion, thereby achieving high speed and high response properties.

In the prior magnet yoke in which the parts produced individually are assembled into the completed yoke unit, it has been very hard to make the yoke reduced in height and, therefore, the slider unit has inevitably become much bulky.

In contrast, according to the slider unit constructed as described above, the moving-coil linear motor may be made reduced in height to provide the slider unit, which is much slim or compact in volume. Thus, this slider unit realizes the saving in space for production, storage, conveying, installation and operation thereof and contributes to the improvement in working conditions of the slider units. Moreover, the enhancement in stiffness of the magnet yoke makes it possible to produce at least the table from aluminum alloys. As a result, the linear motor may be made less in weight and high acceleration and braking can be obtained even in the same output compared with the prior linear motor.

BRIEF DESCRIPTION OF THE DRAWINGS

FIG. 33 is a side elevation of the slider unit shown in FIG. 32:

DETAILED DESCRIPTION OF THE PREFERRED EMBODIMENTS

Figure 1:
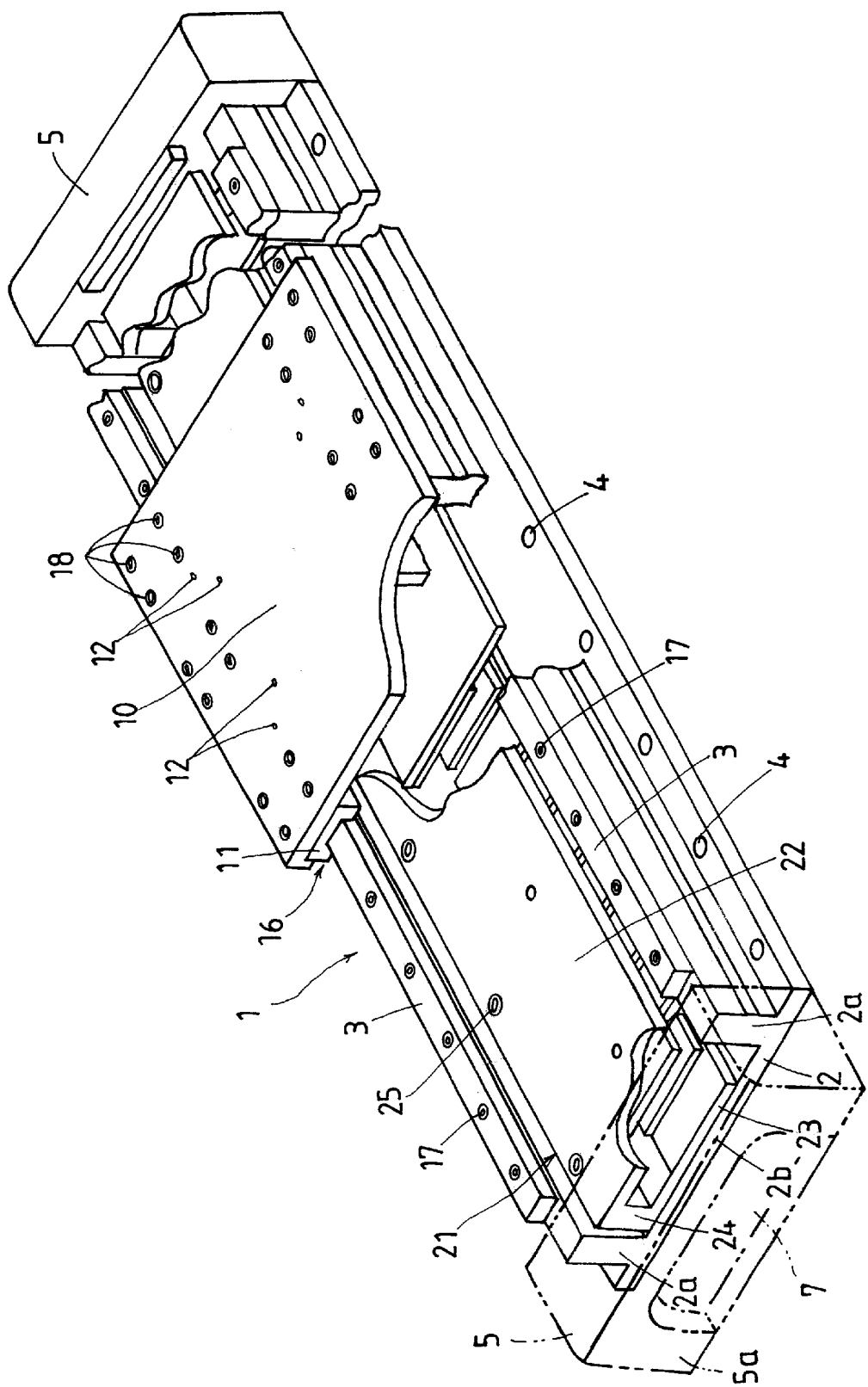
FIG. 1 is a perspective view, partially broken away, showing a preferred embodiment of a slider unit using a moving-coil linear motor in accordance with the present invention.
Figure 2:
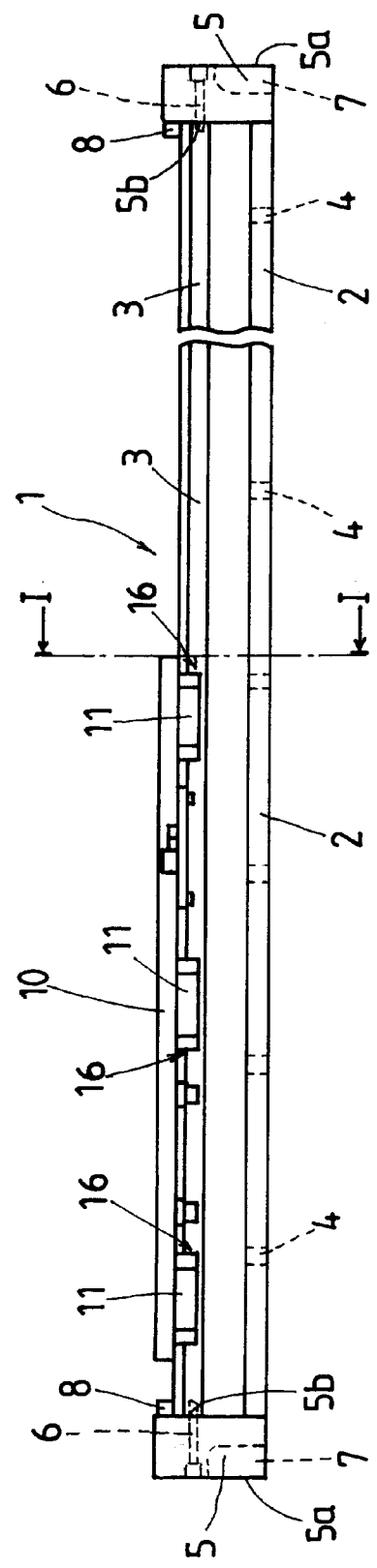
FIG. 2 is a front elevation of the slider unit shown in FIG. 1.
Figure 3:
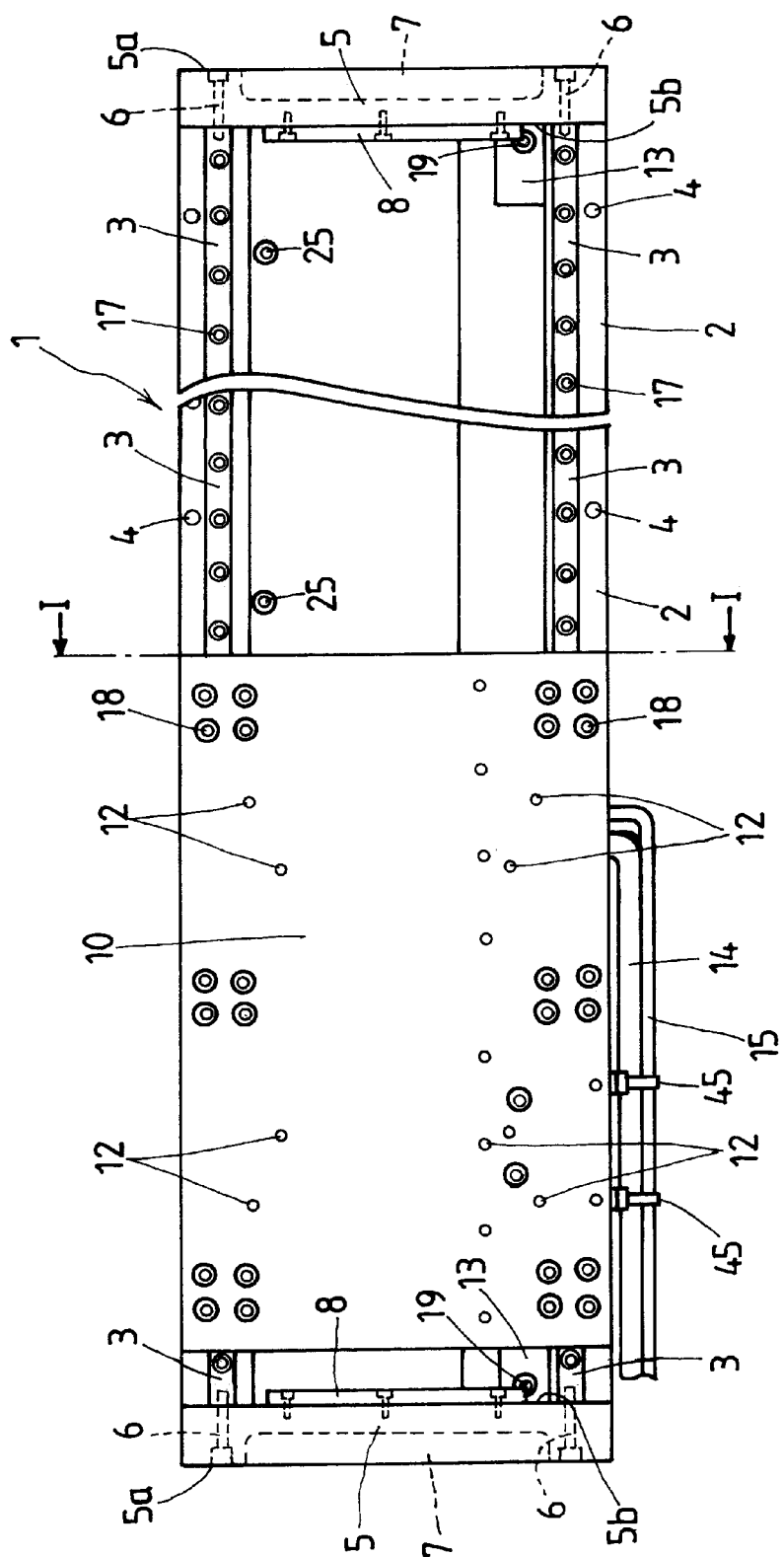
FIG. 3 is a top plan view of the slider unit shown in FIG. 1.
Figure 4:
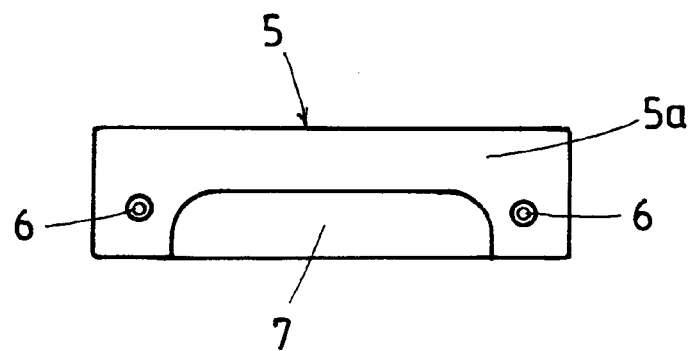
FIG. 4 is a side elevation of the slider unit shown in FIG. 1.

Preferred embodiments of a slider unit with a built-in moving-coil linear motor according to the present invention will be explained hereinafter in detail with reference to the accompanying drawings.

Referring to FIGS. 1 to 5 showing the first preferred embodiment of the present invention, a slider unit 1 is made reduced overall height and mainly comprised of a bed 2 for a stationary member provided with a pair of elongated track rails 3, and a table mounted to sliding elements 11 movable in a sliding manner relatively to the track rails 3. The bed 2 is mounted to any one, ordinarily stationary side, not shown, of relatively movable parts. A pair of the track rails 3 is arranged lengthwise of the bed 2 in parallel with each other at a height identical with each other and fixed to the bed 2 with machine screws 17. The bed is made with holes 4 arranged along the track rails 3 to mount the bed 2 to any one of the parts movable relatively to each other.

Attached on lengthwise opposing ends of the bed 2 are end plates 5 by machine screws 6 to limit the range of stroke, where a table 10 mounted to the sliding elements moves with respect to the track rails 3. Recesses 7 opened downwards are formed at the outermost end faces 5a of the end plates 5. An operator may easily lift or carry the slider unit 1 by putting his hands on the recesses 7. Stoppers 8 of elastic body such as urethane rubber are attached to inside surfaces 5b of the end plates 5, each to each end plate, by small screws to provide buffers for protecting the table 10 from a collision against the end plates 5 when the sliding element 11 comes close to the limit of its stroke. Limiters 13 are arranged on the lengthwise opposing ends of the bed 2 and fixed to the bed 2 with machine screws 19. On the other hand, the table 10 has detecting means to sense the limiters 13 when approaching any one of the opposing ends of the bed 2.

The table 10 has mounted with the sliding elements 11 by means of screws 18, which are movable in a sliding manner with respect to the track rails 3. The table 10 is bored with holes 12 through which screws fit to fix the table 10 to a work, not shown, which is another one of parts movable relatively to each other. Each of the sliding elements 11, in combination with the track rails 3, provides linear motion guide units in which rolling elements run through endless circulating paths composed of raceways defined between raceway grooves, return passages and turnarounds, which are made in the sliding element 11. Thus, the table 10 is allowed to slide relatively along the track rails 3 through the small linear motion guide units 16. Both the bed 2 and the table 10 are made of aluminum alloys, which contribute to the reduction in weight of the slider unit 1. The table made of aluminum alloys renders highly light in weight the moving side so that the slider unit 1 can obtain high acceleration and braking even without considerably powerful electromagnetic prolusion, thereby achieving high speed and high response properties.

The table 10 driven with respect to the bed 2 by the linear motor is connected with power lines 14 to supply electric power to drive the table 10, and provided with sensor cords 15 to pick up signals representing the positions of the table 10 with respect to the bed 2. The sensor cords 15 are connected to a controller, not shown, which is to regulate the electric power supplied through the power lines 14 to drive the linear motor, depending on information as to the positions applied via the sensor cords 15.

Figure 6:
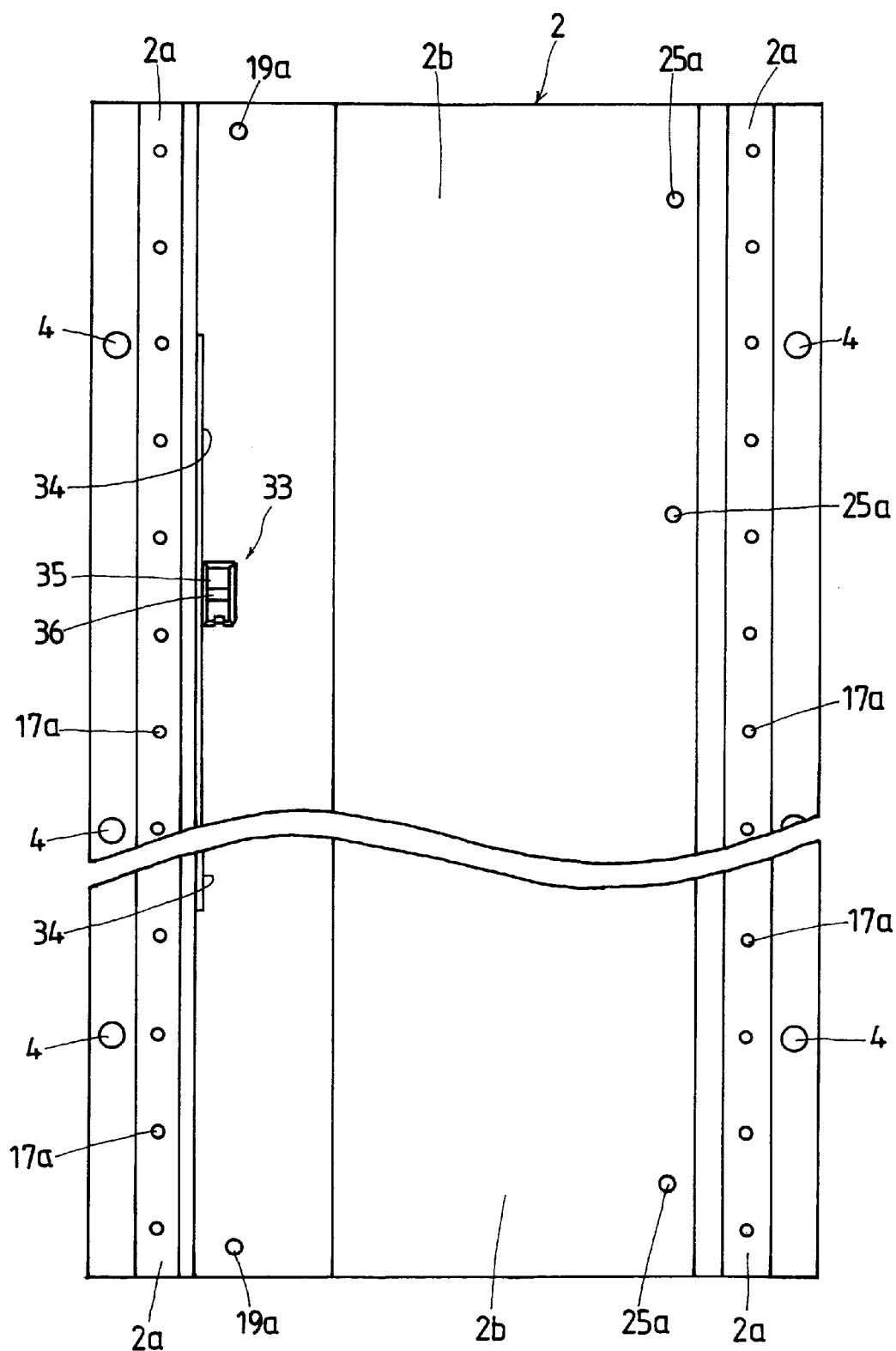
FIG. 6 is a top plan view, partially cut away, showing a bed to be used with the slider unit of FIG. 1.
Figure 7:
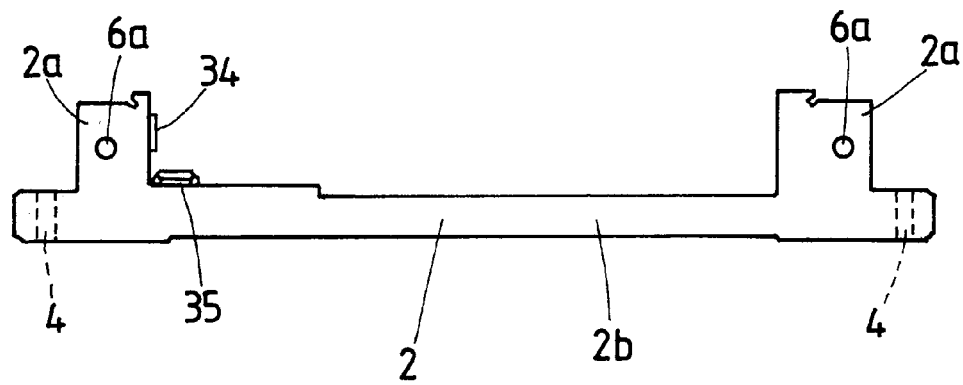
FIG. 7 is a side elevation of the bed shown in FIG. 6.

Referring to FIGS. 6 and 7, the bed 2 for the stationary member of the slider unit 1, shown partially cut away in FIG. 6, has a shallow U-shape in cross section with respect to the moving direction of the table 10, which is composed of an elongated bottom 2b and upright walls 2a arranged at widthwise opposing edges of the bottom 2b. The upright walls 2a are provided at top faces thereof with threaded holes 17a in which machine screws 17 fit to mount the track rails 3 to the top faces. The bottom 2b is made at lengthwise opposing ends thereof with threaded holes 19a in which machine screws 19 fit to attach the limiters 13 to the base 2. The bottom 2b is also made with threaded holes 25a spaced apart at arbitrary interval from each other, in which machine screws 25 fit to mount a magnet yoke 21 to the bed 2. Moreover the bed 2 is provided at the lengthwise opposing end faces thereof with threaded holes 6a into which machine screws 6 fit to attach the end plates 5 on the end faces of the bed 2, each to each end face.

The slider unit 1 has contained therein a moving-coil linear motor 20 having a magnet yoke 21 to support field magnets 30, 31. The magnet yoke 21 is considered a stator part of the moving-coil linear motor 20, which extends lengthwise over the entire length of the bed 2 and is mounted to the bed 2. The magnet yoke 21 is composed of an upper web 22 and a lower web 23, which are arranged in opposing relation to each other to provided between them an elongated gap 32, and a connecting web 24 interconnecting integrally the confronting upper and lower webs 22, 23 at any one side of widthwise opposing edges extending along the moving direction of the table 10. The magnet yoke 21 is also provided with a sidewise opening 32a at another side of the widthwise opposing edges extending along the moving direction of the table 10. The magnet yoke 21 is mounted to the bed 2 with machine screws 25, which fit into threaded holes 25a in the bed 2, with passing through holes in the connecting web 24. The magnet yoke 21 is fixed to the bed 2, with the lower web 23 resting on the bed 2 and the connecting web 24 coming in abutment against the upright wall 2a at its outside surface. The table 10, as shown in FIG. 5, is faced to a top surface of the upper web 22 of the magnet yoke 21 with leaving a clearance 26 between them and allowed to run on the bed 2.

The magnet yoke 21 is of such construction that the confronting webs 22, 23 are formed integrally with the connecting web 24, and the integral construction helps ensure the overall high stiffness despite the confronting webs 22, 23 being made thin. Thus, the magnet yoke of the present invention may be made considerably thin, compared with the prior magnet yoke. The magnet yoke thin in thickness results in the slider unit 1 reduced in overall height. Even when the confronting webs 22, 23 for the magnetic yoke 21 are made reduced in thickness to such an extent that the deflection of about 0.8 mm might occur in the conventional magnet yoke assembled with fixing means such as screws, the confronting webs 22, 23 of integral construction described just above are less subject to the deflection owing to the magnetic attraction over a tolerable minor extent where no trouble might take place in operation of the linear motor. The integral construction of the magnet yoke 21 contributes to reducing the number of machines screws required for fixing, compared with the yoke in which the confronting webs and the connecting web prepared separately are joined with mechanical fasteners.

Figure 8:
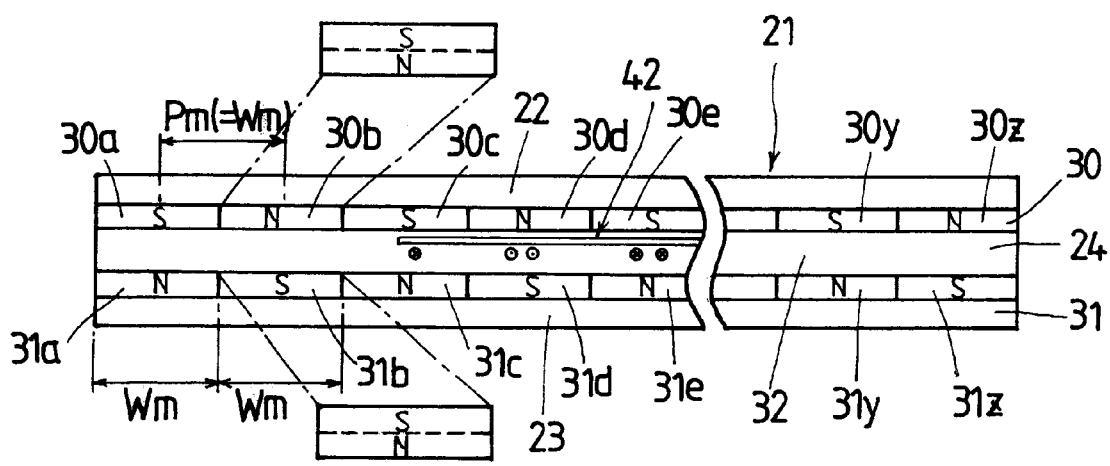
FIG. 8 is a front elevation, partially cut away, showing a magnet yoke adapted to the slider unit shown in FIG. 1.
Figure 9:
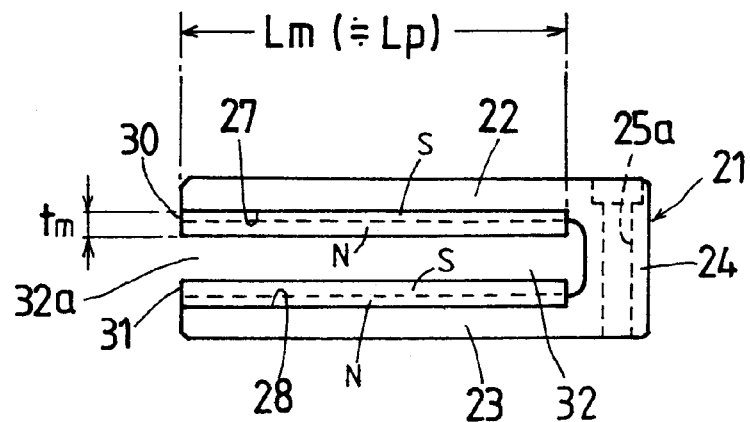
FIG. 9 is a side elevation of the magnet yoke shown in FIG. 8.

The field magnets 30, 31 in the form of sheet are arranged on the inwardly opposing surfaces: lower surface 27 and upper surface 28 of the confronting webs 22, 23, each to each surface. As shown in FIGS. 8 and 9, the field magnets 30, 31 are composed of thin magnet pieces 30a~30z, 31a~31z, which are magnetized such that the poles on either piece alternate in polarity lengthwise along the bed 2. The magnet pieces 30a~30z, 31a~31z are closely placed side by side such that unlike poles oppose directly to each other across an air gap 32. As shown in FIG. 9 and especially shown as being represented by the magnet pieces 30b, 31b in FIG. 8, each magnet piece is magnetized in the direction of thickness and shaped in the form of a thin rectangular solid having a thickness of tm, a length of Lm and a width of Wm. An unlike pole pitch Pm spanned between adjacent magnet pieces of unlike poles along the lengthwise direction of the bed 2 is identical with the width Wm of magnetic pole of the magnet piece, which is measured in the lengthwise direction of the bed 2. The end plates 5 close the lengthwise opposing ends of the field magnets 30, 31, thereby protect the field magnets against foreign matter, which might otherwise invade inside the slider unit 1 owing to magnetic attraction caused by to the field magnets 30, 31.

Figure 5:
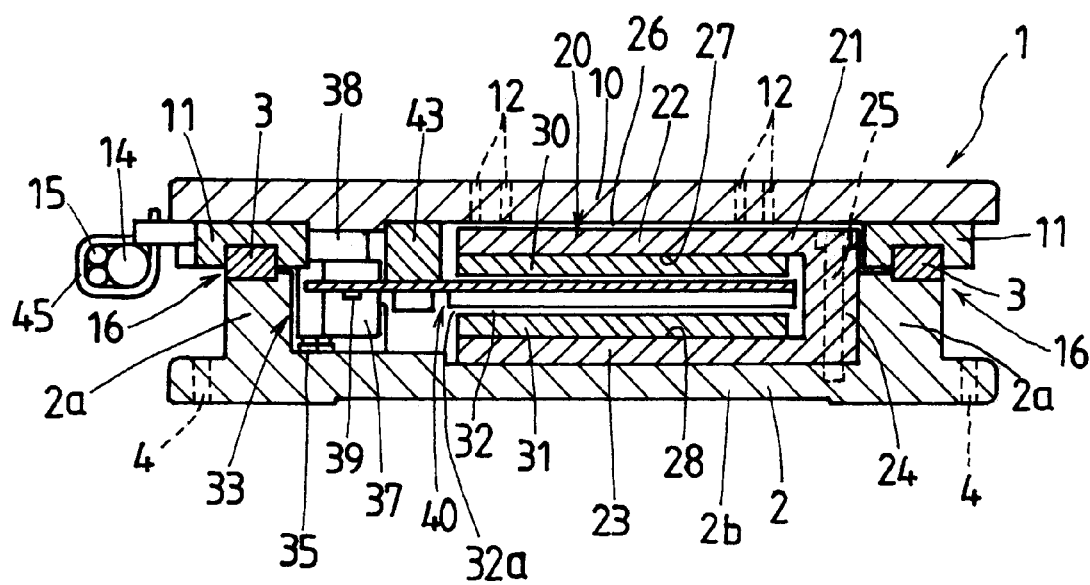
FIG. 5 is a cross-sectional view taken along the plane I—I of FIGS. 2 and 3.

The slider unit 1, as shown in FIGS. 5 and 6, is provided with sensor means 33 for monitoring information as to the position of the table 2 with respect to the bed 2. The sensor means 33 is composed of a linear scale on the side of the bed 2 and a sensor head 37 on the side of the table 10. The elongated linear scale 34 is attached on the inside surface of the upright wall 2a nearby a sidewise opening 32a of the magnet yoke 21, whereas the sensor head 37 is either magnetic or optic, and is placed on the underside of the table 10 through an intermediate seat 38. The linear scale, as placed inside the bed 2, is less fear of breakage. On the bottom 2b of the bed 2 there is provided an origin mark 35 where an origin magnet 36 is inserted at a point corresponding to the origin of the linear scale 34. When the sensor means 33 is the optical type, the sensor head 37 is made of an optical sensor having a light-emitting device and photo-detection device, not shown.

As the sensor means 33 is entirely built in the slider unit 1, there is no part projecting outside the slider unit 1. This makes the slider unit 1 compact in construction and trimmed in appearance, and further allows the slider unit 1 to operate, in practice, with less interference with other peripheral instruments. The sensor means 33 is placed near the central area of the moving table 10 and therefore is less subject to the adverse influence of changes in position such as pitching, yawing and rolling as the table 10 moves, so that the accurate sensing control may be accomplished. In addition, as the sensor head is arranged nearby a moving-coil assembly 40, which will be described hereinafter in detail, the wiring for the sensor may be neatly arranged in a slim area.

Figure 10:
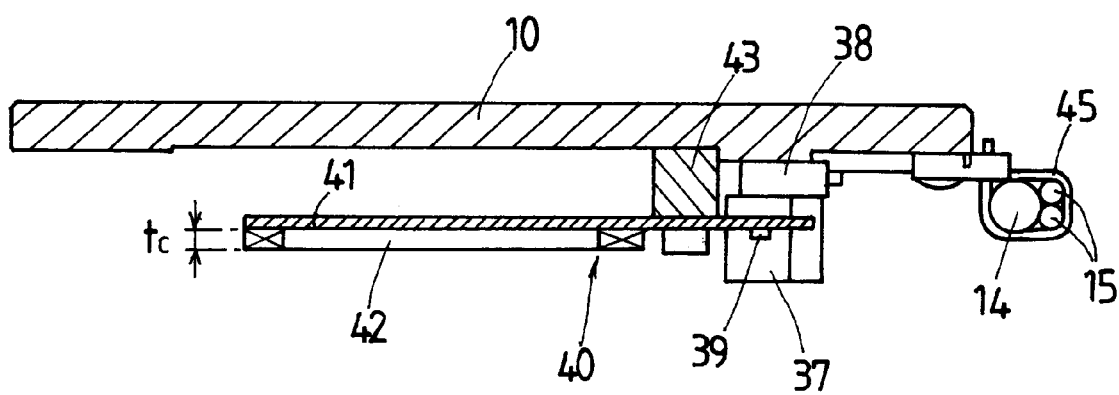
FIG. 10 is a cross-section of a table supporting a moving-coil assembly of the slider unit shown in FIG. 1.
Figure 11:
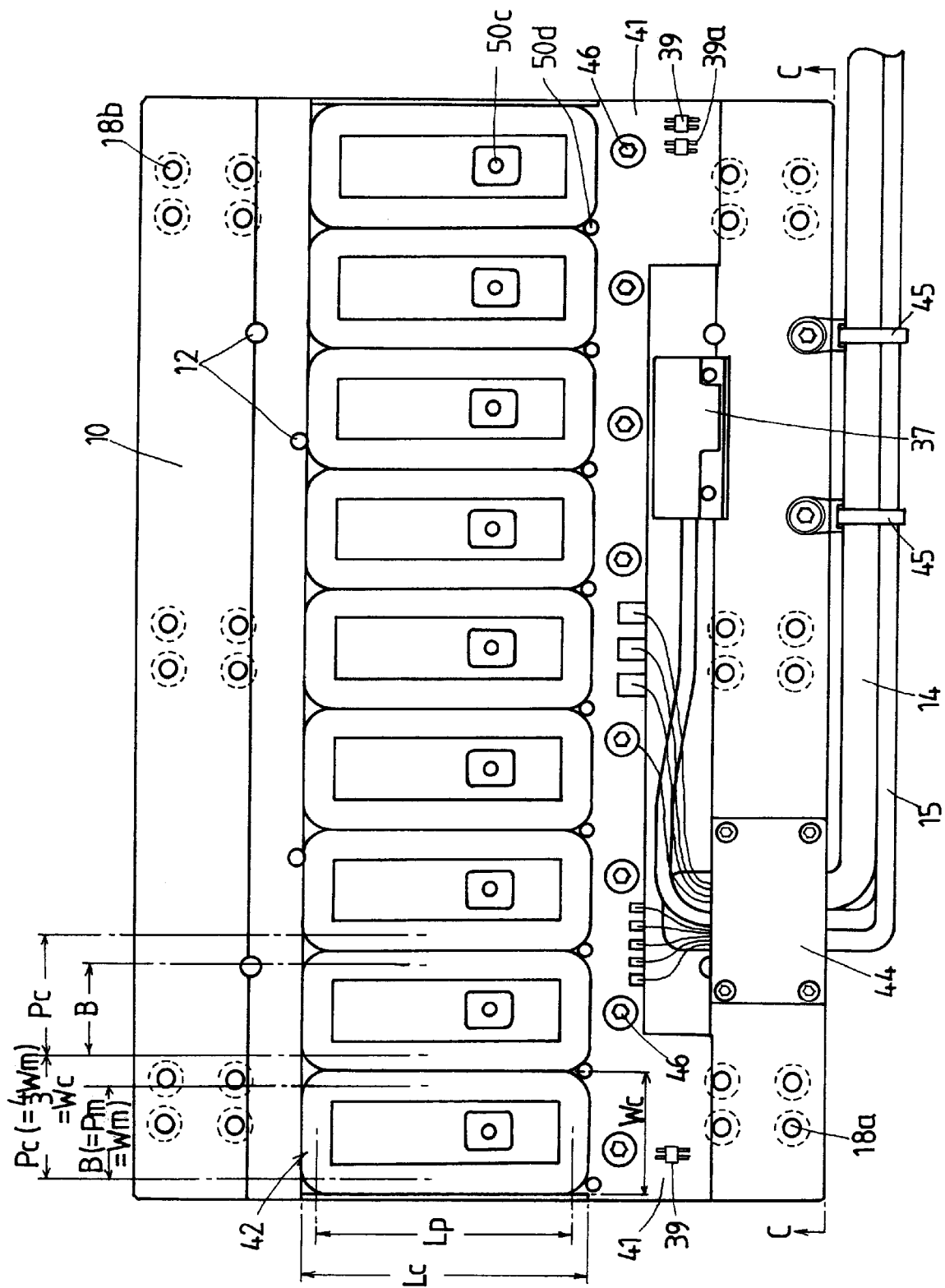
FIG. 11 is a bottom plan view of the table in FIG. 10.
Figure 12:
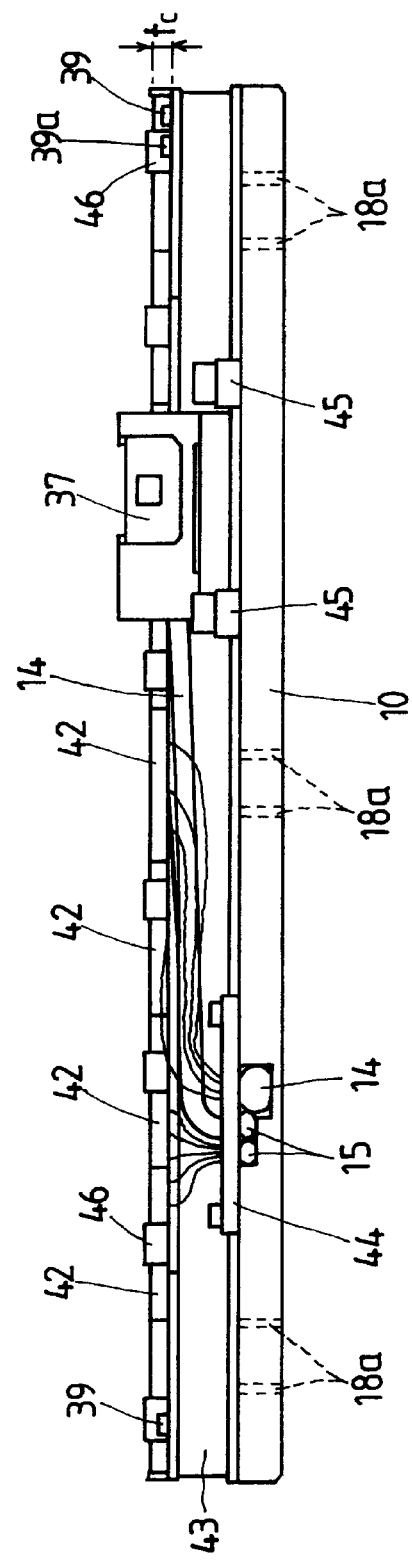
FIG. 12 is side elevation of the table in FIG. 10.

Next referring to FIGS. 10 to 12 illustrating in detail the moving-coil assembly 40 of the slider unit 1 supported to the table 10, the moving-coil assembly 40 is arranged adjacent to the sensor head 37 and mounted to the underside of the table 10 through a support bar 43. The moving-coil assembly 40 is comprised of a coil board 41 mounted to the support bar 43 in substantially parallel with the underside of the table 10, and a moving element of polyphase armature coils 42 mounted to the coil board 41. The moving-coil assembly 40 is arranged to extend in the air gap 32 through the sidewise opening 32a of the magnet yoke 21. The armature coils 42 are made in the form of three-phase coreless coils. Thus, six or nine armature coils 42, which are a multiple of three, are arranged closely in a row. Each armature coil 42 includes turns looped in a plane parallel with the underside of the coil board 41. As shown in FIGS. 10 and 11, an armature coil 42 of Wc in width, Lc long and tc thickness is provided, in which turns are shaped in the form of rectangle by either winding them around a hollow core or molding them with resinous material. Moreover, the armature coil 42 is made such that a width center pitch B is equal the unlike pole pitch Pm (=Wm) of the field magnets 30, 31, and a coil pitch Pc becomes (4/3) Pm (=(4/3)Wm). In the case shown here, the adjoining armature coils 42 are arranged coming in close contact with each other in their widthwise direction so that the width Wc is made identical with the coil pitch Pc: the width Wc=the coil pitch Pc. A sidewise length Lm of any one of the field magnets 30, 31 is defined approximately equal to a length center pitch Lp of the armature coil 42.

On the underside of the oil board 41 mounted to the table 10, there are arranged limit sensors 39 of optical sensor along widthwise opposing lengthwise edge areas. The limiters 13, refer to FIG. 3, arranged on the lengthwise opposing ends of the bed 2 are made of light-reflecting plates, so that any limit sensor 39 senses the reflection at the light-reflecting plates of a ray emitted from the limit sensor 39 itself, thereby realizing the table 10 reaching its limit of stroke. Detecting the limit of stroke by the limit sensors 39 ensures keeping the table 10 from travelling over the tolerated stokes. Nearby any one of the limit sensors 39 is provided a before-the-origin sensor 39a, shown in FIG. 11, made of a magnetic pickup to sense that the table 10 exists just before the origin. Thus, the before-the-origin sensor 39a may detect the table 10 has reached just before the origin, ahead of the detection of the origin mark 35 by the sensor head 37 of the sensor means 33 so that the position control of the table 10 may be improved in efficiency.

The power lines 14 and sensor cords 15 are tied together with a retainer plate 44 and clipping bands 45 and supported to table 10 to hold their shape along the table 10. The support bar 43 to mount the moving-coil assembly 40 to the table 10 is an elongated member of the length corresponding to the lengthwise size of the table 10. The support bar 43 is also made with holes 46 spaced apart from each other with preselected intervals, in which machine screws fit to hold the coil board 41 to the table 10.

Figure 13:
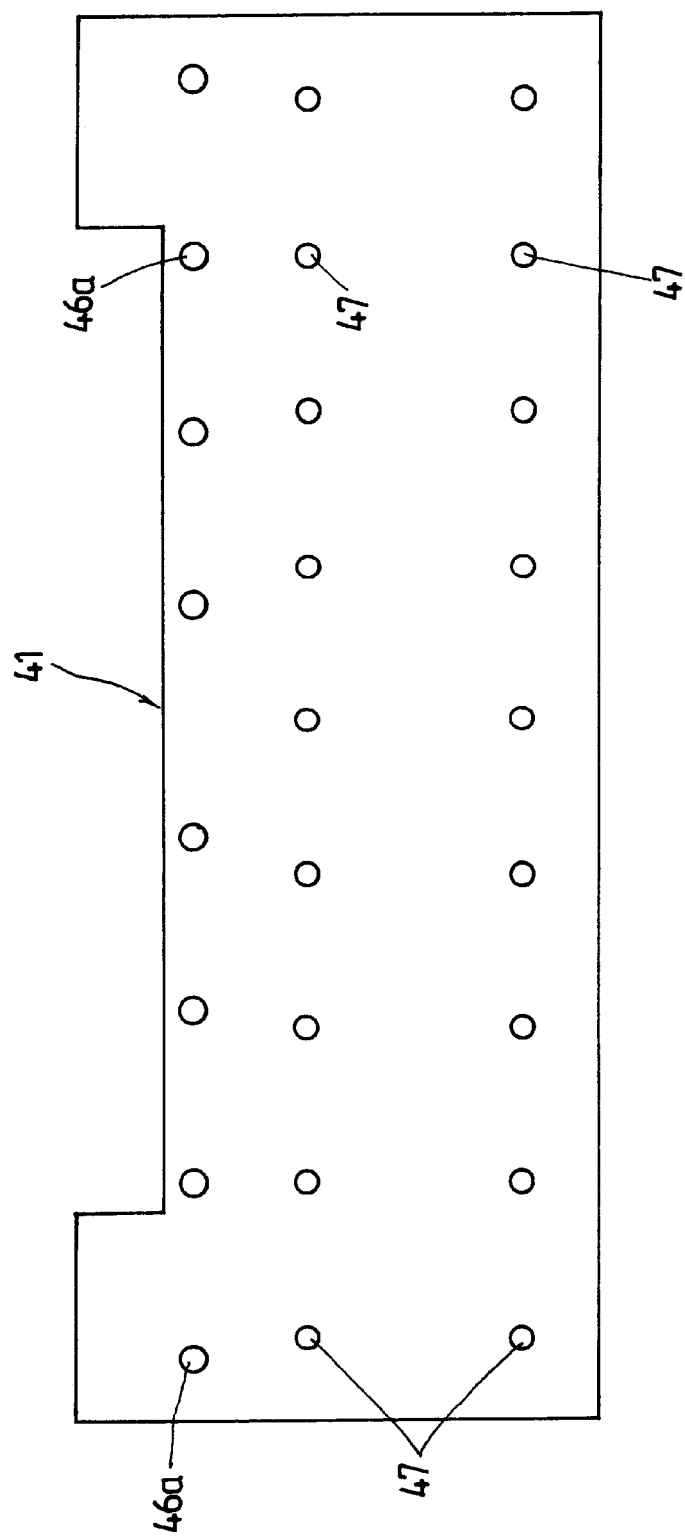
FIG. 13 is a top plan view showing a coil board employed in the moving-coil assembly of the slider unit shown in FIG. 1.

The coil board 41 and the armature coils 42 to be held on the coil board 41 will be described in detail with reference to FIGS. 13 to 15. The coil board 41, as apparent from the top plan view thereof, is made with holes 46a arranged in a row in alignment with the holes in the support bar 43, in which the machine screws 46 fit to mount the coil board 41 to the table 10. The coil board 41 is also made with nine pairs of recesses, holes or perforations 47 spaced at regular intervals along the lengthwise direction thereof to place in preselected position the nine armature coils 42.

Figure 14:
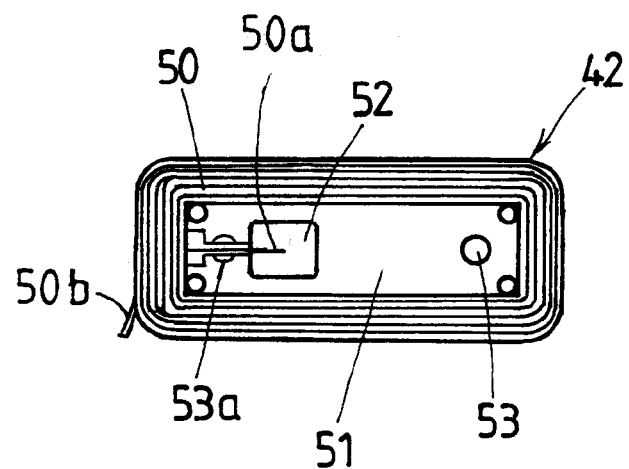
FIG. 14 is a top plan view showing an armature coil incorporated in the moving-coil assembly of the slider unit shown in FIG. 1.
Figure 15:
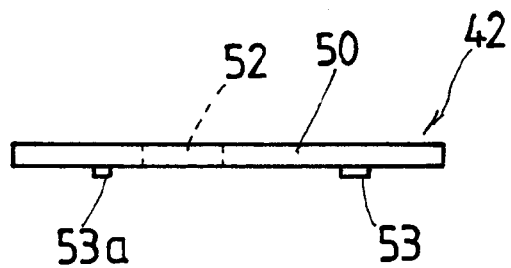
FIG. 15 is a side elevation illustrating the armature coil of FIG. 14.

As seen from FIGS. 14 and 15, the armature coil 42 comprises a core member 51 of molded resinous material, and winding turns 50 looped around the core member 51 in the form of flat rectangular solid. The core member 51 is made with an aperture 52 through which any one end 50a of the winding turns 50 is led out for wiring connection, and also provided with a pair of convexities 53, 53a on a surface thereof facing the coil board 41. The convexity 53 has a round contour conformable to each recess 47 formed on the coil board 41, whereas another convexity 53a has an appearance resembling partly with the former convexity 53. Fitting the convexity 53 in the associated recess 47 in the coil board 41 helps ensure the secure fastening of the armature coil 42 to the coil board 41 with no fear of causing the out-of-place even under high-speed operation of the table 10. The armature coil 42, though adhered to the coil board 41 with adhesive, is molded with resinous material and, therefore, is less subject to deformation due to high temperature. This results in improving the structural strength of the armature coil 42, thereby allowing higher-speed of operation than any other prior slider units. The one end 50a of the winding turns 50 is connected to each associated terminal 50c on the coil board 41, whereas another end 50b led out of the winding turns 50 is connected to any one of other terminals 50d on the coil board 41, as shown in FIG. 11.

Figure 16:
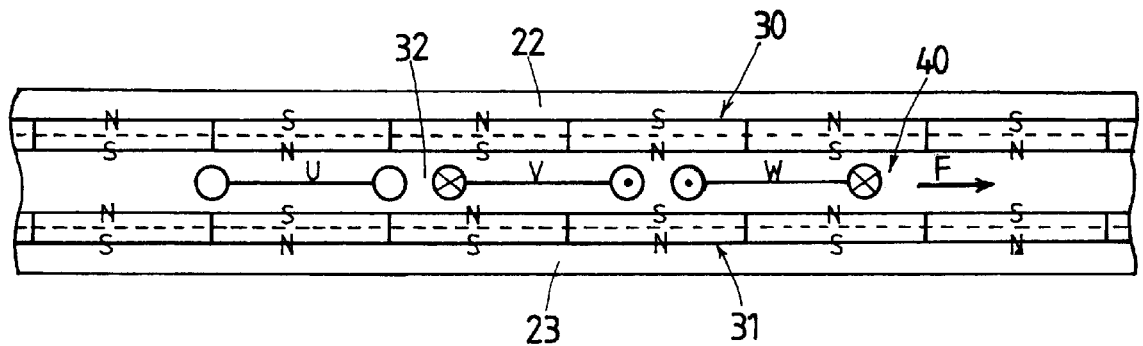
FIG. 16 is an illustration explaining the operation of the linear motor in the slider unit shown in FIGS. 1 to 15.

The magnetic flux created by the field magnets 30, 31 is allowed to pass through the magnet yoke 21 and across the air gap 32 in perpendicular to pole-faces of the confronting field magnets 30, 31. The armature coils 42 are, as shown in FIG. 16, arranged in the air gap 32 between the confronting field magnets 30, 31, with the direction of the winding turns of the armature coils 42 crossing at right angles across the magnetic flux existing in the air gap between the confronting field magnets 30, 31. When the armature coils 42 carry current, a mechanical force F in accord to Fleming's left-hand law is exerted upon the coil magnets 42, or the table 10 supporting the coil magnets 42, which is thus forced in the widthwise direction of the magnet yoke 21: the direction of F to move along the lengthwise direction of the bed 2. In contrast, when the current flowing through the armature coils 42 is reversed, the table 10 is moved in the direction opposite to the arrow F. It will be understood that the table 10 may move to the desired position by controlling the conducting direction and duration of the current applied to the armature coils 42.

Figure 17:
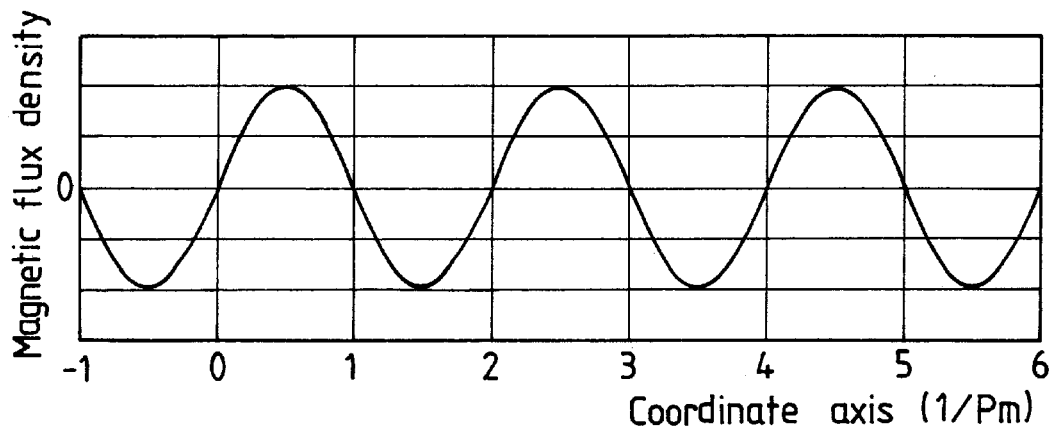
FIG. 17 is a graphic representation of a magnetic flux density occurring in a gap, depending on the position of the table.
Figure 18:
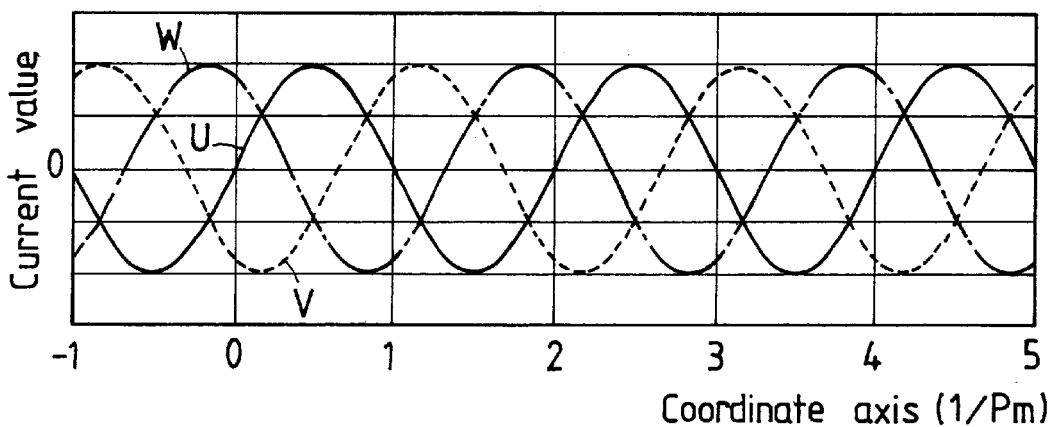
FIG. 18 is a graphic representation explaining variations in currents flowing in three adjoining armature coils.
Figure 19:
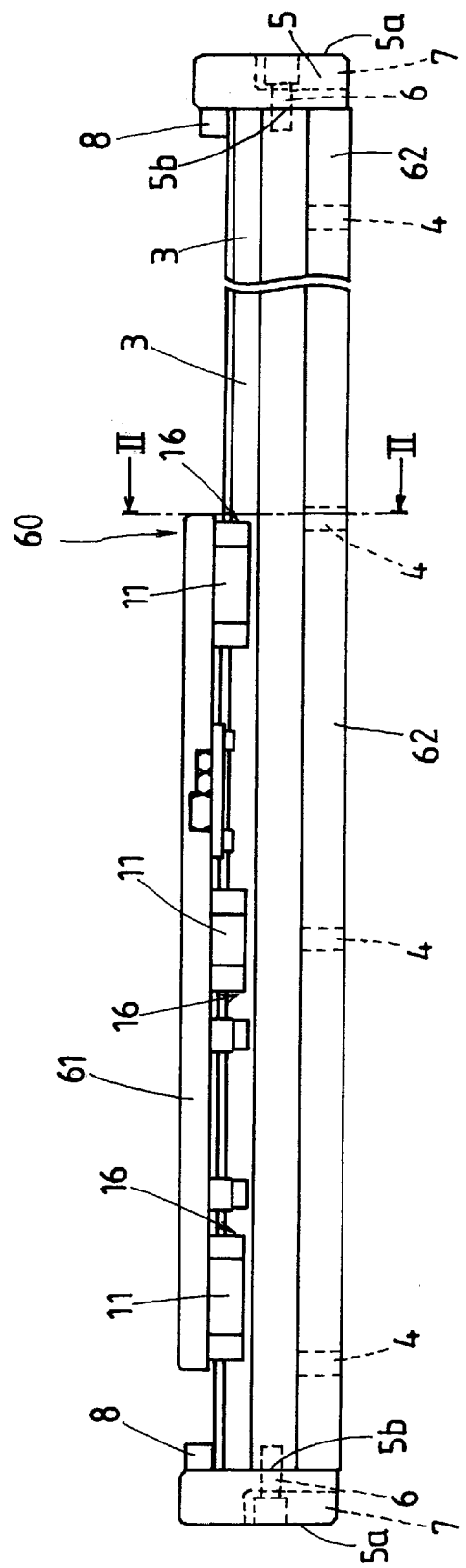
FIG. 19 is a front elevation, partially cut away, showing a second embodiment of the small slider unit, in which a linear motor of the present invention is built.
Figure 20:
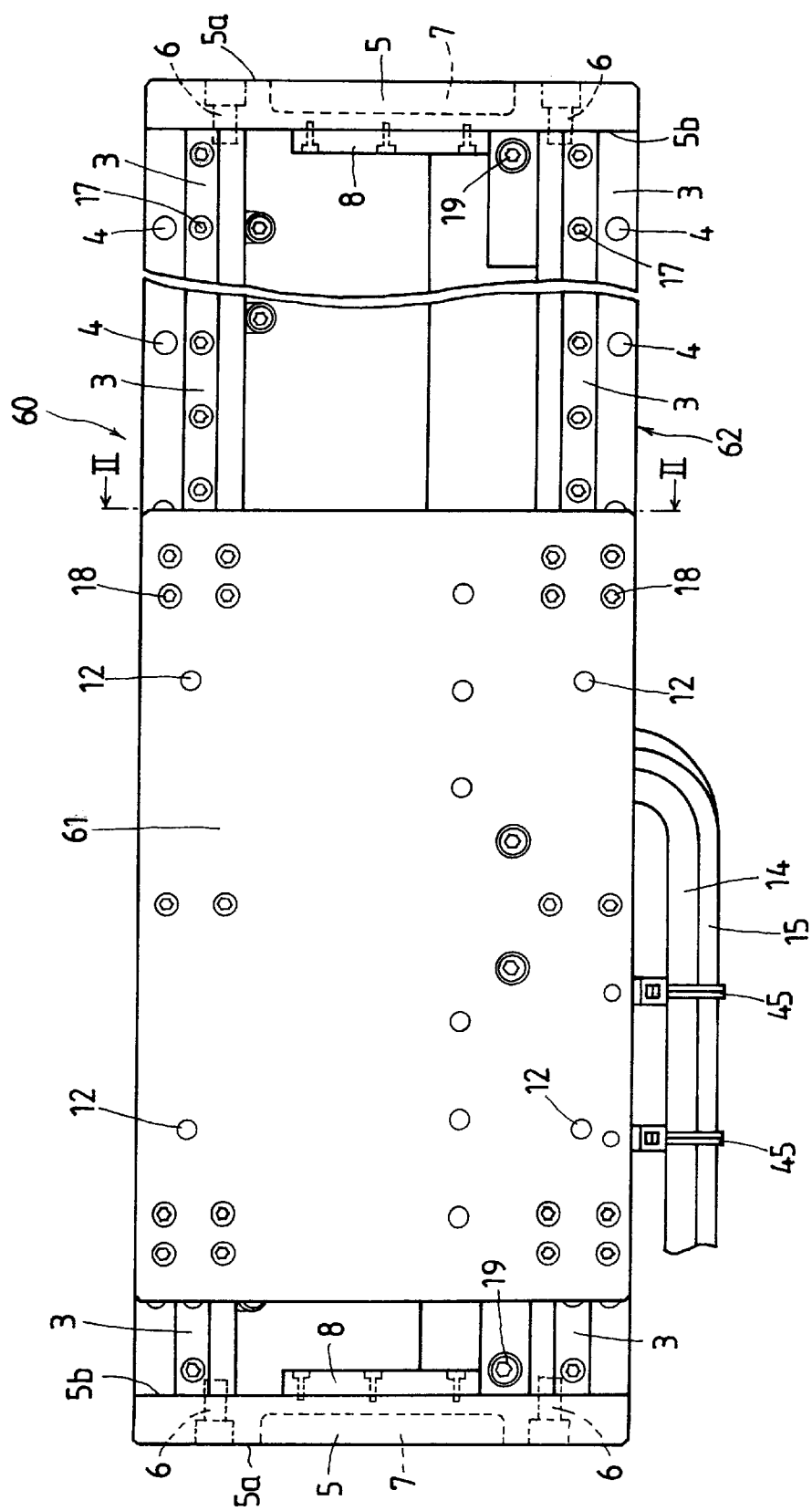
FIG. 20 is a top plan view of the small slider unit shown in FIG. 19.
Figure 21:
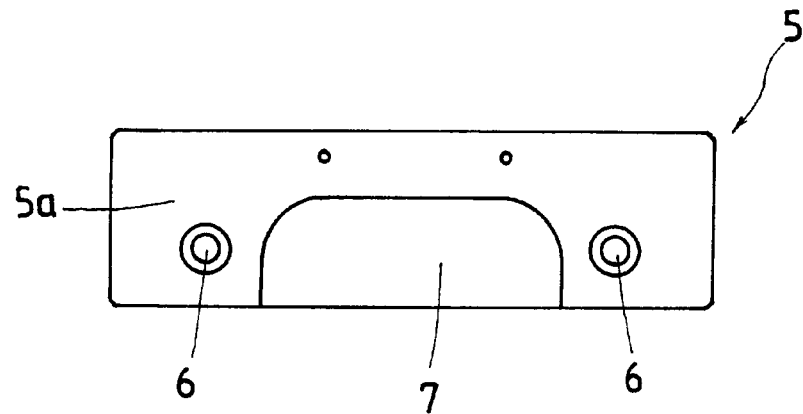
FIG. 21 is a side elevation of the small slider unit of FIG. 19.
Figure 22:
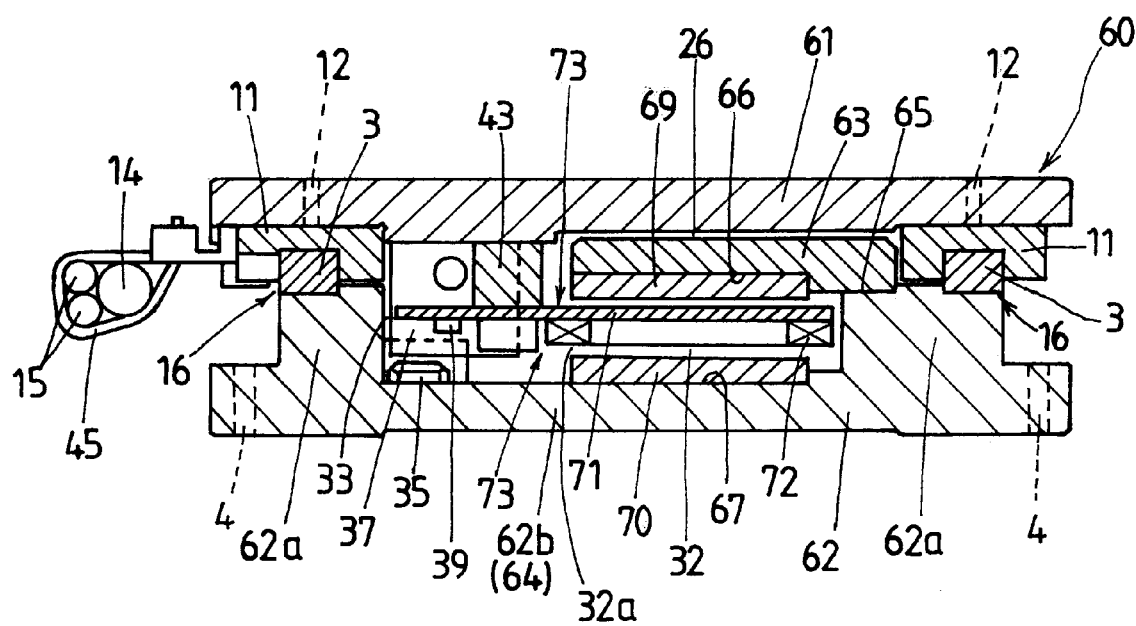
FIG. 22 is a cross-sectional view of the slider unit, taken along the plane II—II of FIGS. 19 and 20.

As shown in FIGS. 16 to 18, the magnetic flux density produced across the air gap 32 by the confronting field magnets 30, 31 varies sinusoidally as shown ideally in FIG. 17, depending on the positions of the bed 2 along the coordinate axis, because the poles on the magnet pieces alternate in polarity (north, south, north, south) linearly along the air gap 32. Each armature coil 42 carries any one of polyphase currents denoted by reference letters U, V and W in FIG. 18, which have the same magnitude but are out of phase, and alternate sinusoidally in accordance with the magnetic flux direction in the air gap 32, or depending on the positions of the associated armature coil 24 along the coordinate axis. When the moving-coil assembly 40, for example, occupies a position of zero value on the coordinate axis shown in FIG. 18, the current in phase U does not exist on its associated armature coil 42, whereas the currents in phases V and W flow in their associated armature coils 42 in the direction perpendicular to the plane of the paper. Thus, the windings on either armature coil 42(V) or armature coil 42(W) are subjected to the thrust force acting rightwards (in the direction of F) by virtue of Fleming's left-hand law, so that a set of the armature coils 42 or the moving-coil assembly 40 is always driven continuously in the direction of F in FIG. 16 whereby the table 10 may continue to move linearly.

In initial conduction, controlling means is previously stored with information as to the unlike pole pitch (width) Pm in the field magnets 30, 31, resolving-power of the sensor means such as an encoder, direction toward the origin, and the like. The instant the armature coils 42 carry current, the conducting position is detected and the controlling means starts to regulate the operation of the moving-coil assembly 40. The moving-coil assembly 40 is firstly servo-locked and then driven to a desired position found according to the detected signal representing the conducting position. When it is desired to make the origin the home position of the operation, the moving-coil assembly 40 is driven initially towards the origin mark 35. At standstill, no current flows in the moving-coil assembly 40. To get the moving-coil assembly 40 into motion, accordingly, once the table 10 is moving, the controlling means begins operating to return the moving-coil assembly 40 to the position where it has come to a standstill. Thus, the moving-coil assembly 40 may remain in whatever position the moving-coil assembly 40 last ceased moving. It will be understood that the slider unit 1 is allowed to move lengthwise as well as stop moving at any desired position.

Another embodiment of the slider unit according to the present invention will be hereinafter described with reference to FIGS. 19 to 31.

In the slider unit 60 shown in FIGS. 19 to 31, the like reference numerals designate the components or parts identical or equivalent in function with that used in the slider unit 1 in FIGS. 1 to 14, so that the previous description will be applicable. As seen from FIG. 22, the slider unit 60 is made slim in construction and composed of a movable table 61 and a stationary bed 62. A magnet yoke is composed of an upper magnet yoke 63 and a lower magnet yoke 64. The upper magnet yoke 63 is attached directly to a stepped top-face 65 of any one of upright walls 62a with no use of the support bar, but use of screws. The lower magnet yoke 64 is provided by a bottom 62b itself of the stationary bed 62. An upper field magnet 63 is attached to an underside 66 of the upper magnet yoke 63, and a lower field magnet 70 is mounted to a flat upper-surface 67 formed on the bottom 62b of the bed 62. The table 10 is made of aluminum alloys, whereas the stationary bed 62, as doing double duty for the magnet yoke 64, is made of ferromagnetic material (S45C). Although the steel-made bed 62 results in rendering the slider unit 60 heavy in weight, the embodiment described herein contributes to keeping the slider unit 60 from becoming bulky to achieve much slim construction of the slider unit 60. The field magnets 69, 70 and the magnet yokes 63, 64 including the upright walls 62a of the bed 62 provide the stationary part of the moving-coil linear motor.

Figure 23:
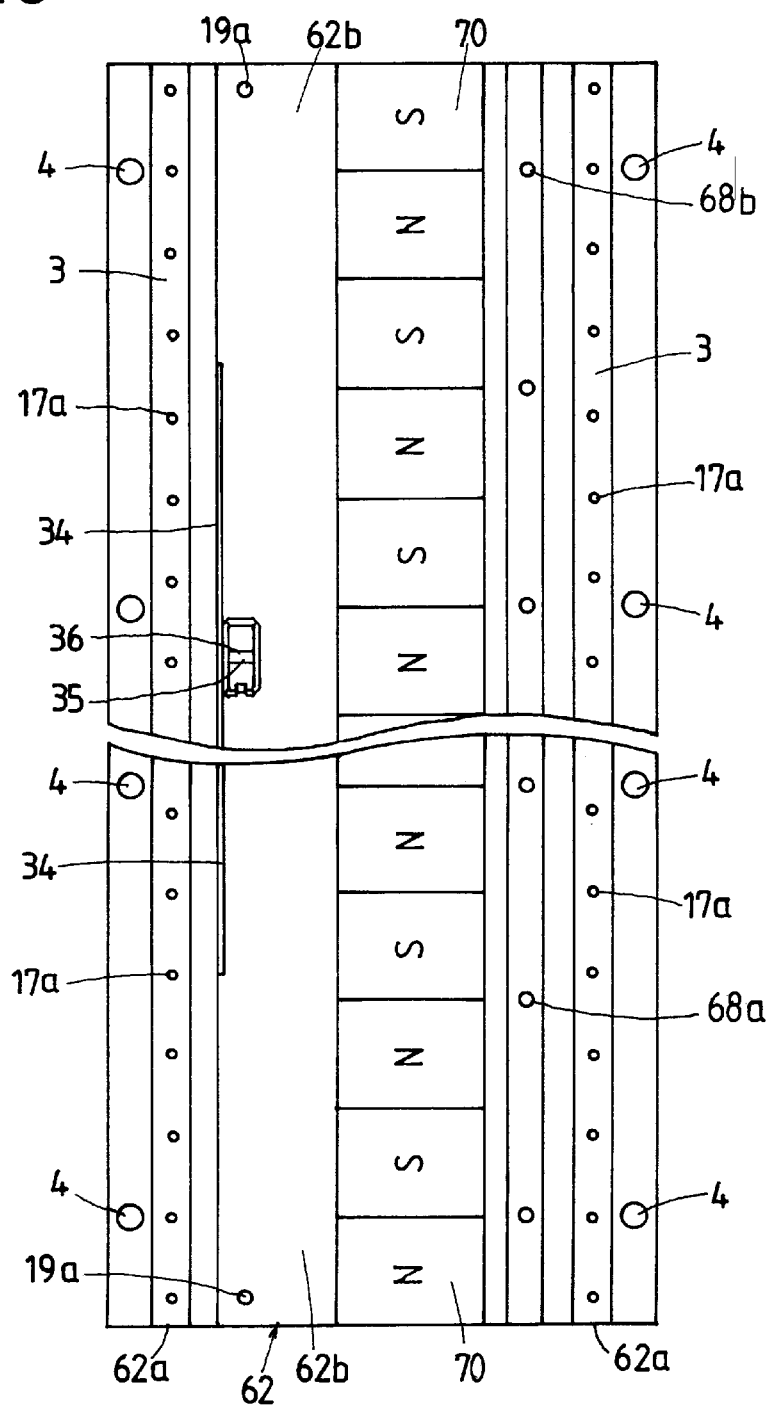
FIG. 23 is a top plan view of a bed adapted to the slider unit shown in FIGS. 19 to 21.
Figure 24:
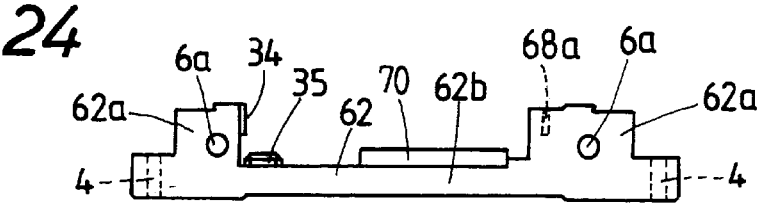
FIG. 24 is a side elevation of the bed in FIG. 23.
Figure 25:
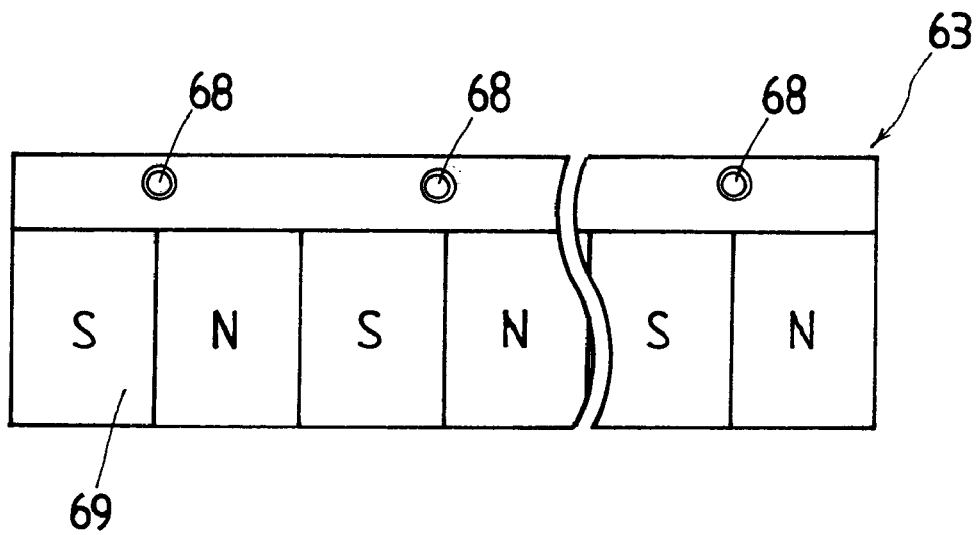
FIG. 25 is a bottom plan view, partially cut away, of a magnet yoke adapted for the small slider unit shown in FIGS. 19 to 21.
Figure 26:
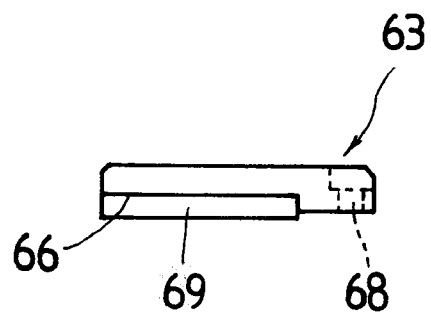
FIG. 26 is a side elevation of the magnet york in FIG. 25.

The lower field magnet 70, as seen from FIGS. 23 and 24, is mounted on the bottom 62b of the bed 62. An origin mark 35 and origin magnet 36 are substantially identical in construction with them installed in the embodiment shown in FIGS. 6 and 7. The upper field magnet 69 attached to the underside 66 of the upper magnet yoke 63 is composed of magnet pieces arranged closely in such a manner that unlike magnetic poles alternate linearly along the lengthwise direction of the magnet yoke 63. Moreover, the magnet yoke 63 is made with counter-bored holes 68 along a sidewise-offset area causing no interference with the field magnet 69. Thus, the magnet yoke 63 is mounted to any one of the upright walls 62a of the bed 62 by means of machine screws, which pass through the counter-bored holes 68 and fit into threaded holes 68a formed in the upright wall 62a.

Figure 27:
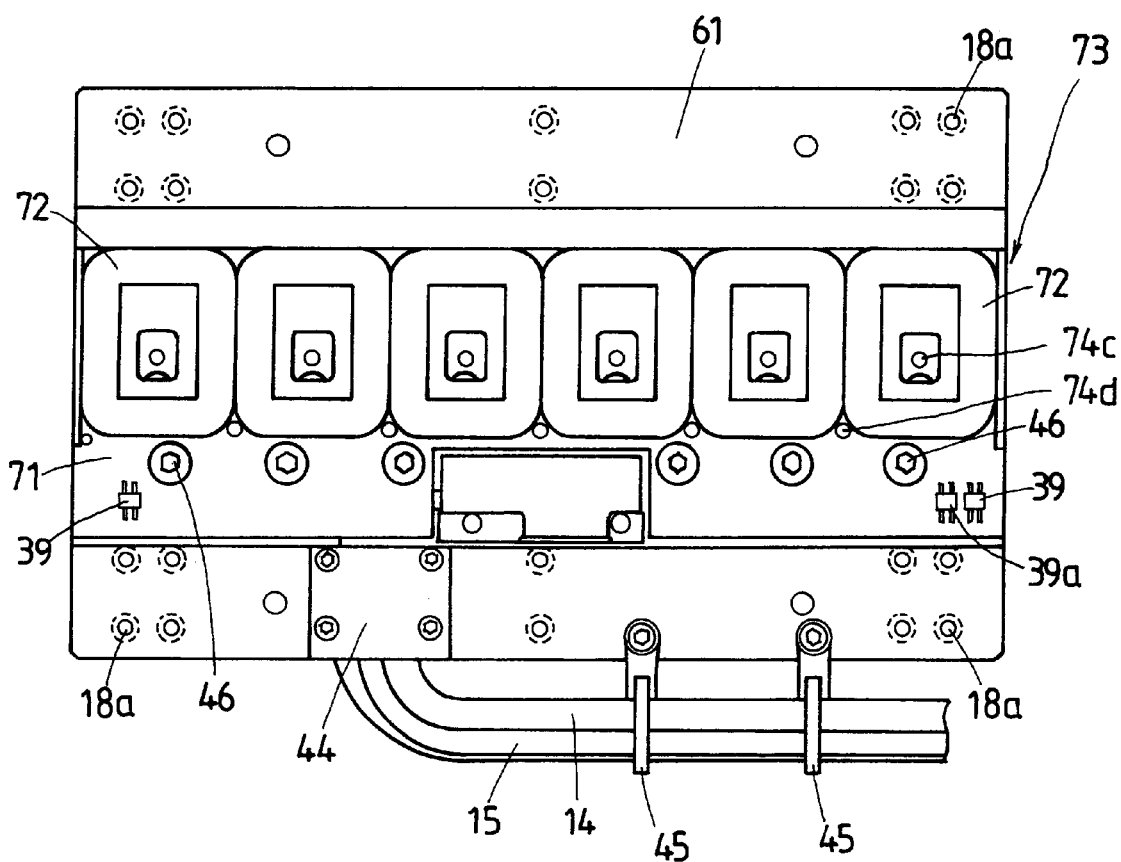
FIG. 27 is a bottom plan view showing a table mounted to the moving-coil assembly adapted for the small slider unit shown in FIGS. 19 to 21.
Figure 28:
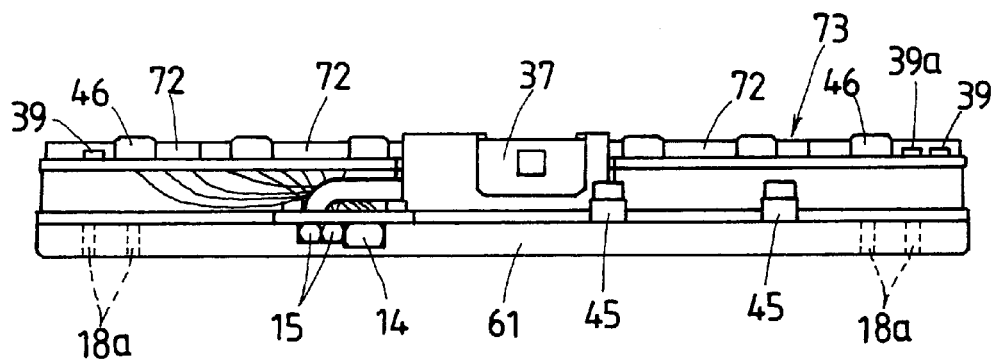
FIG. 28 is a front elevation showing the table of FIG. 27 upside down.
Figure 29:
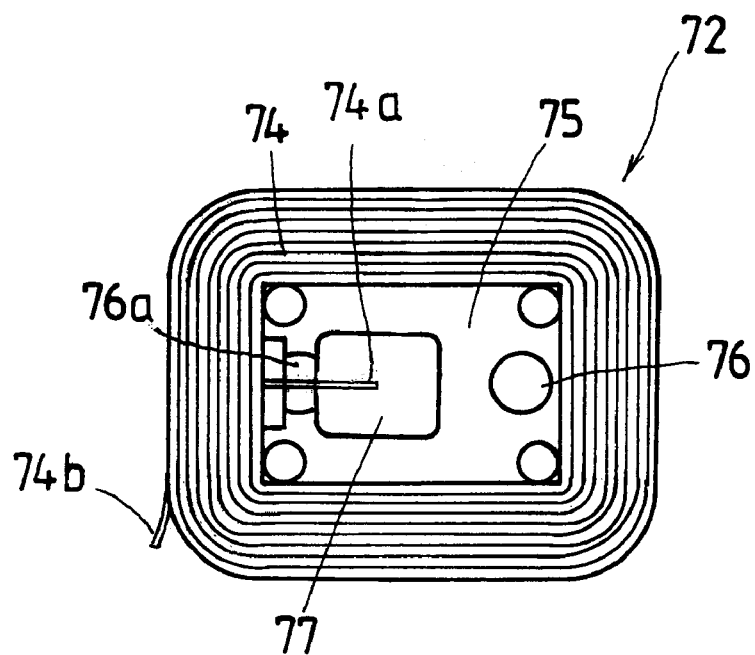
FIG. 29 is a top plan view showing an armature coil for the moving-coil assembly shown in FIG. 27.
Figure 30:
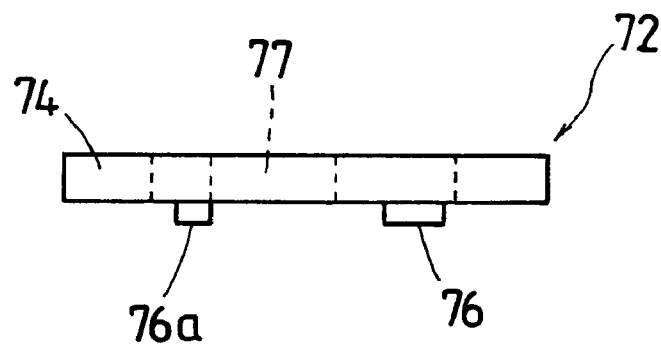
FIG. 30 is a side elevation of the armature coil shown in FIG. 29.
Figure 31:
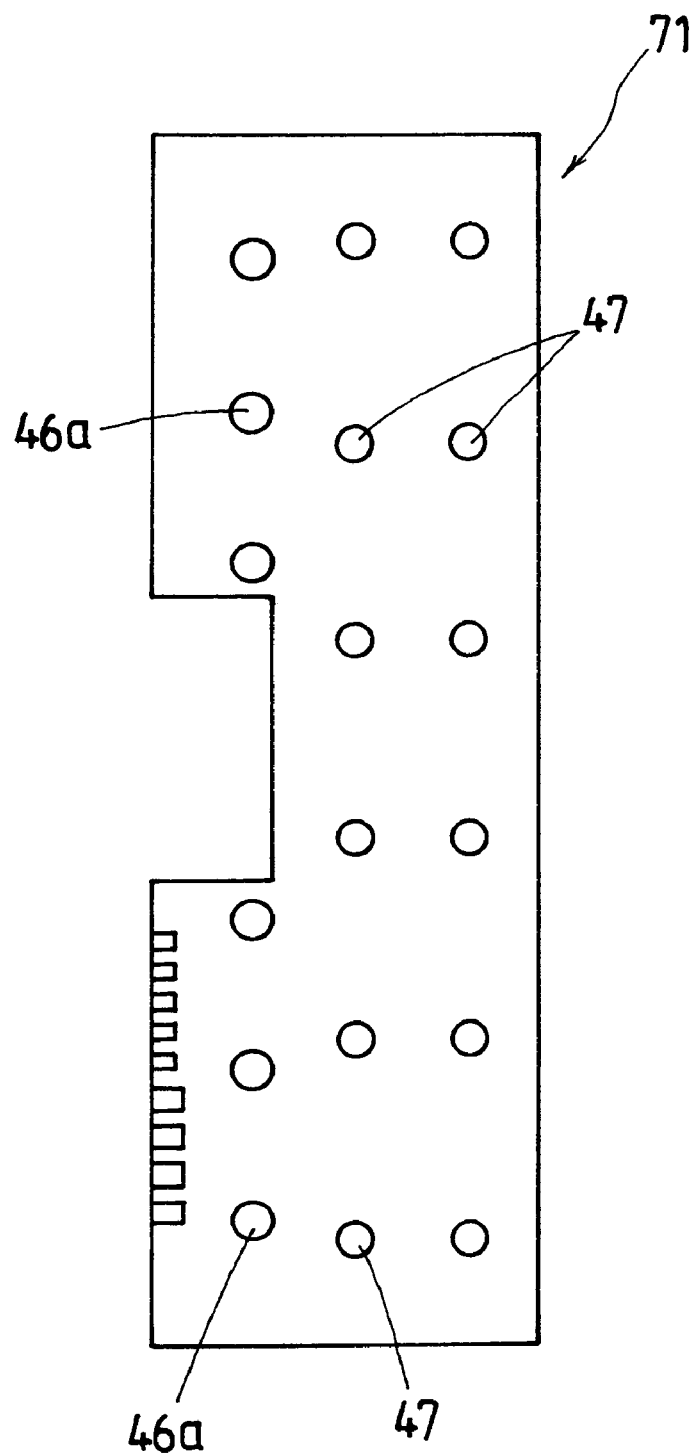
FIG. 31 is a top plan view showing a coil board used in the moving-coil assembly.
Figure 32:
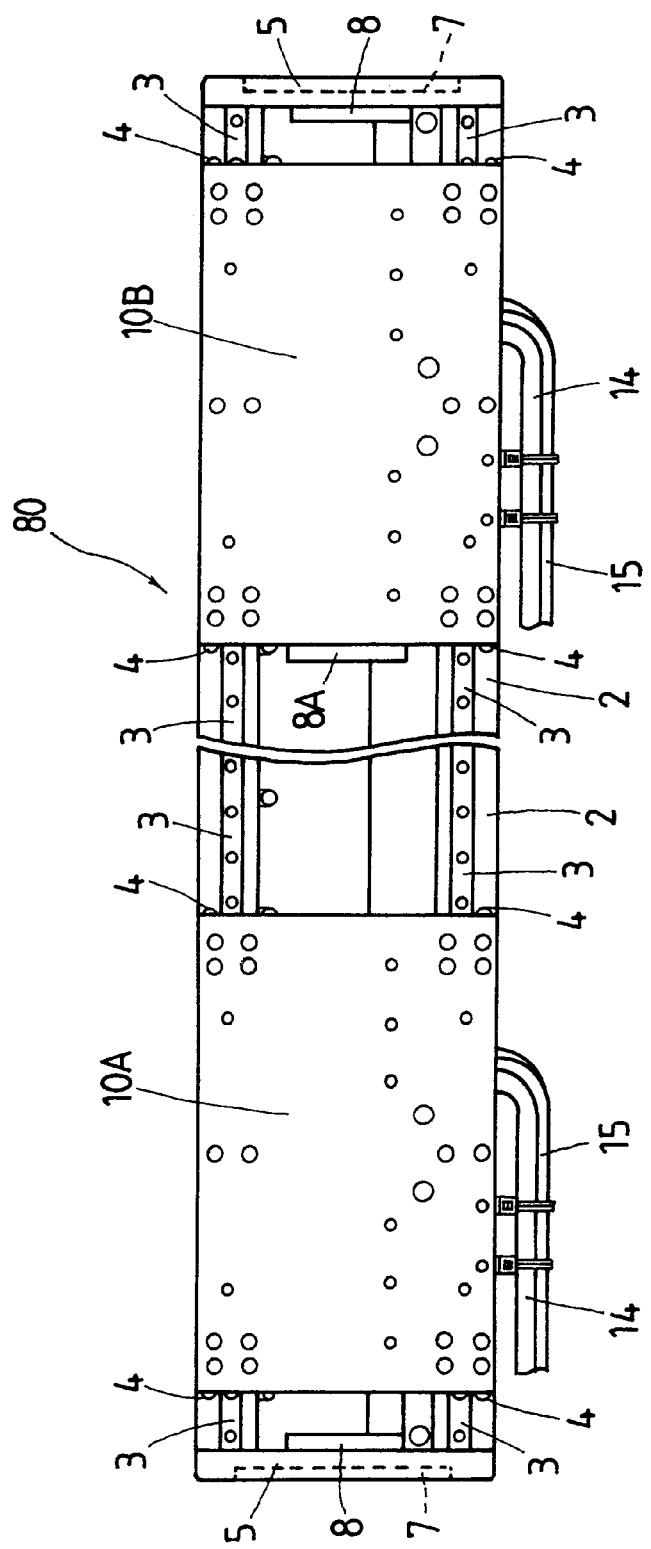
FIG. 32 is a top plan view showing a third embodiment of a slider unit provided with a moving-coil linear motor in accordance with the present invention.

The movable part of the moving-coil linear motor is a moving-coil assembly 73 shown in FIGS. 27 and 28. Referring to FIGS. 39 and 30, the armature coil 72 is composed of a winding 74 and a core member 75 of molded resin. The winding 74 is made much slim or compact in size and also wound in the form a rectangle much alike a square, compared with the armature coil 42 shown in FIG. 31. This design of the winding 74 enables to fit the armature coil 72 snugly in the slider unit 60 made in much slim construction. The armature coil 72 is made with a pair of convexities 76, 76a, which are provided for fitting in their associated recesses 47 formed in a coil board 71 to thereby place securely the armature coil 72 with respect to the coil board 71. Likewise with the convexity 53a in the armature coil 42, the convexity 76a resembles partly in appearance with the convexity 76, which has circular contour. The core member 75 is made with an aperture 77 through which any one end 74a of the winding 74 is led out for wiring connection with any one of terminals 74c on the coil board 71. On the other hand, another end 74b led out of the armature coil 74 is connected to any one of other terminals 74d on the coil board 71.

Figure 34:
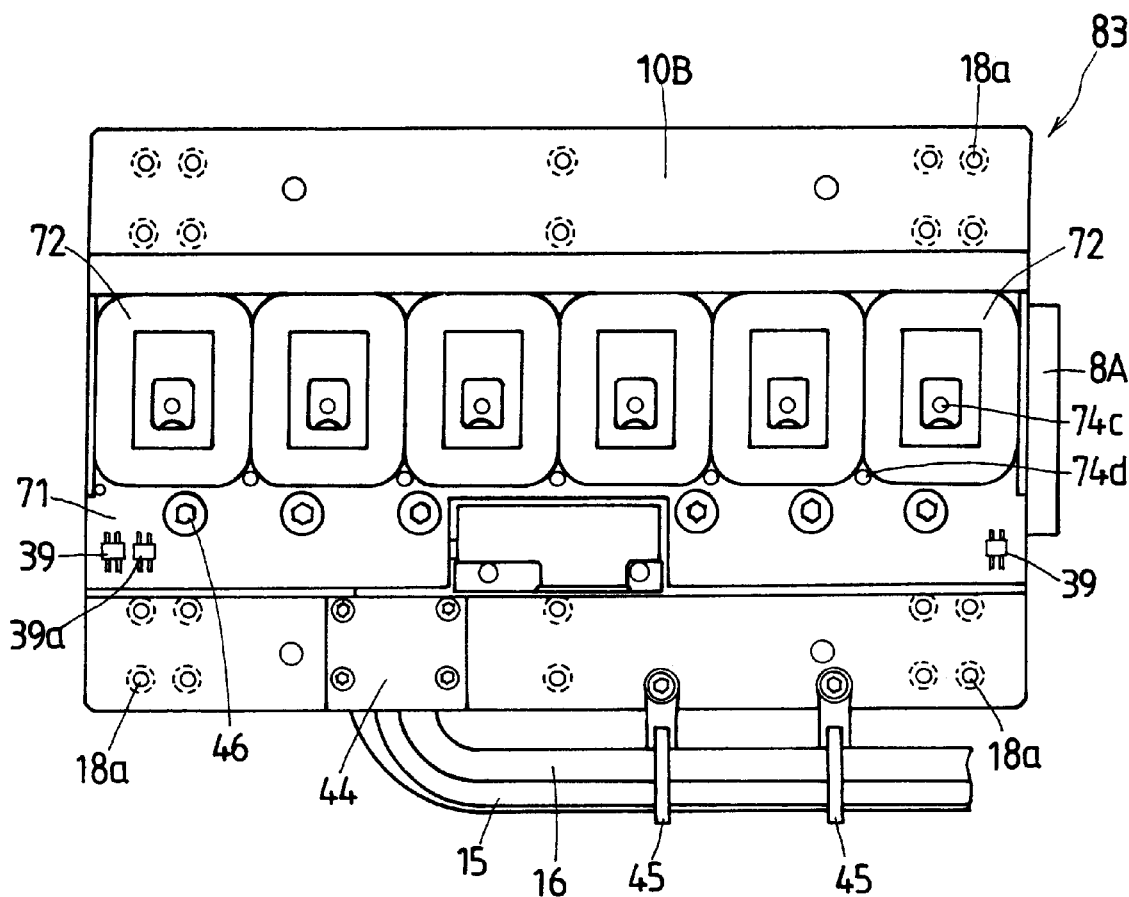
FIG. 34 is a bottom plan view showing a moving-coil assembly for the slider unit in FIG. 32.
Figure 35:
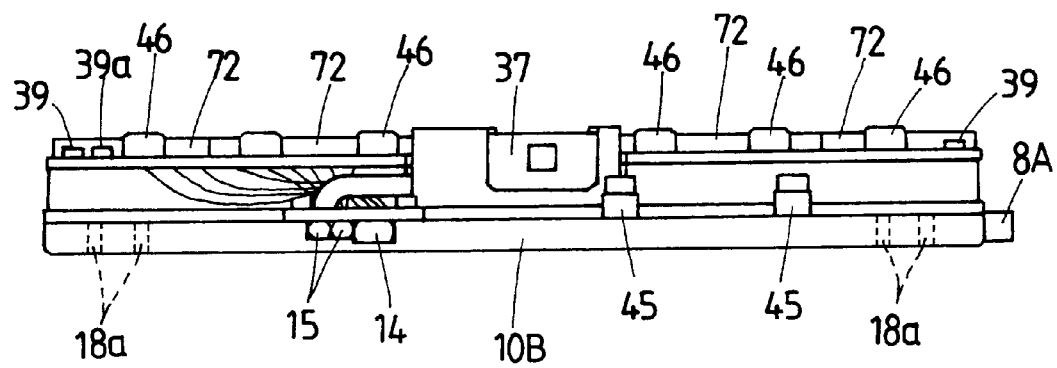
FIG. 35 is a front elevation of the moving-coil assembly in FIG. 34.

In FIGS. 32 to 35, there is shown a slider unit 80 according to another embodiment of the present invention. The slider unit 80 has a twin table, or two tables 10A, 10B, movable on the single bed 2. The table 10B out of the tables 10A, 10B has a stopper 8A on its one end plate facing another table 10A. The stopper 8A is made of elastic material such as urethane, which is equivalent with the elastic stopper 8 on the end plate 5 of the slider unit 1 according to the first embodiment, in order to buff impact of collision between the tables 10A, 10B. A moving-coil assembly 83 combined with the table 10B shown in FIGS. 34 and 35 is substantially similar in construction with the moving-coil assembly having described above in conjunction with FIGS. 27 and 28, except that the stopper 8A is attached to one end of the table 10B and the before-origin sensor 39a is arranged in juxtaposition with the limit sensor 39 on the end opposite to the end where the stopper 8A is installed.

Figure 36:
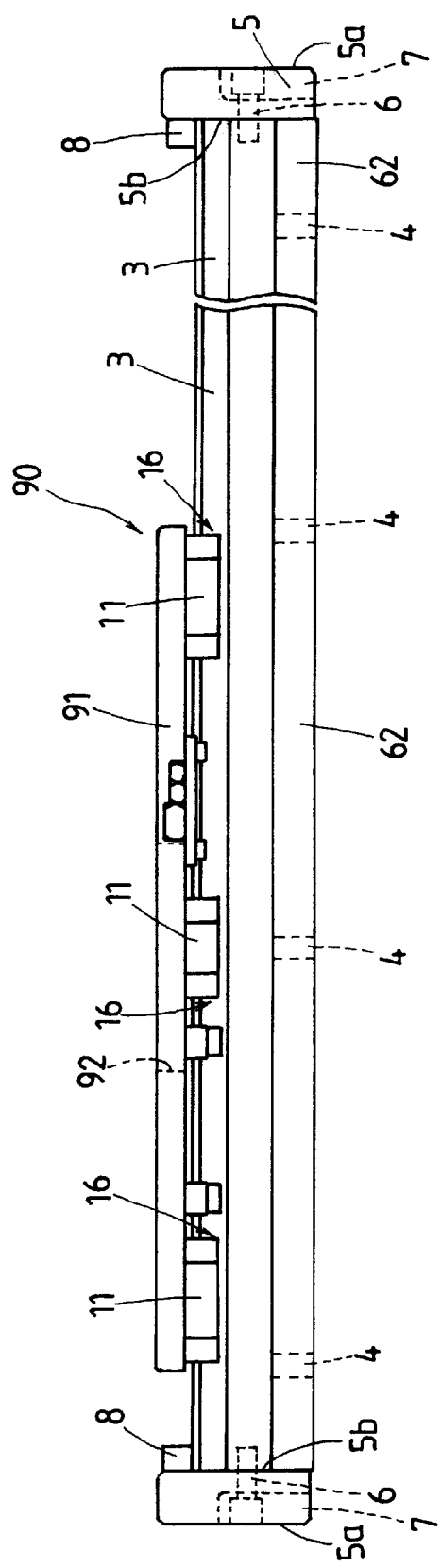
FIG. 36 is a front plan view showing a fourth embodiment of a slider unit having a built-in moving-coil linear motor in accordance with the present invention.
Figure 37:
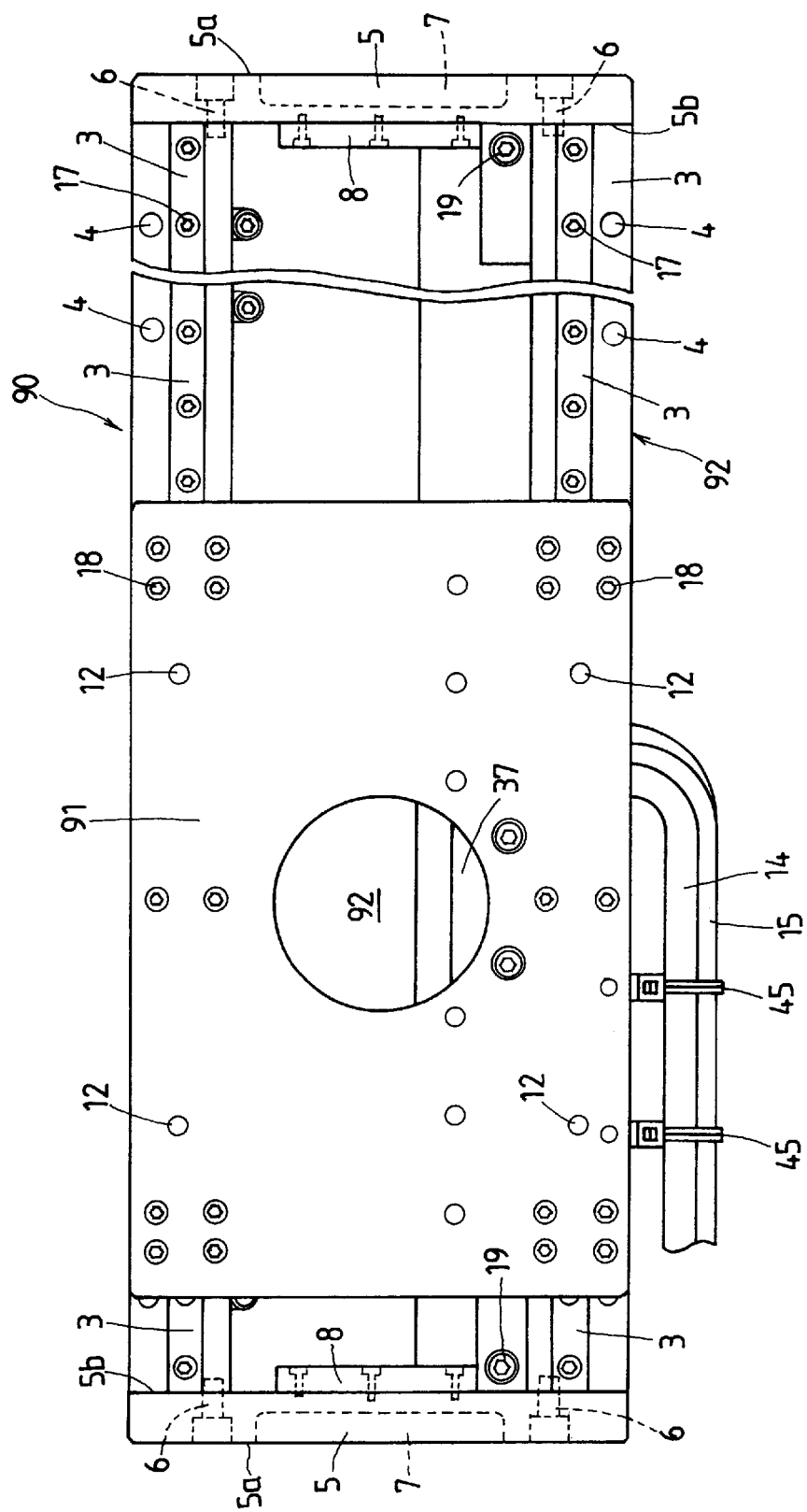
FIG. 37 is a top plan view of the slider unit shown in FIG. 36.

Next, FIGS. 36 and 37 show a slider unit 90 according to a further another embodiment of the present invention. The slider unit 90 is substantially identical in construction with the embodiment shown in FIGS. 19 and 20, with the exception of an access port 92 to the interior of the slider unit 90, which is provided at the center of a table 91. Although the sensor head 37 to detect the linear scale 34 is arranged adjacent to the moving-coil assembly underneath the table 91, either the posture or position of the sensor head 37 may be easily adjusted through the access port 92 formed in the table 91.

What is claimed is:

1. A slider unit with a built-in moving-coil linear motor, comprising a bed supporting thereon a magnet yoke, a table movable through linear motion guide units in a sliding manner with respect to the bed, end plates mounted to lengthwise opposing ends of the bed, each to each end, a pair of field magnets arranged on inwardly confronting surfaces of the magnet yoke in such a manner that poles on the field magnets alternate in polarity along a moving direction of the table and also unlike poles confront each other across an air gap between the field magnets, and a moving-coil assembly mounted to the table and provided with armature coils arranged in the air gap, wherein the moving-coil assembly moves together with the table by virtue of electromagnetic interaction of magnetic flux of the field magnets with current flowing in the armature coils, the magnet yoke is composed of a pair of confronting sections having thereon the field magnets, each to each section, and a connecting section to join the confronting sections to each other at their lengthwise edges extending along the moving direction of the table, and the moving-coil assembly extends into the air gap, with passing through a sidewise opening formed at another edges of the confronting sections extending along the moving direction of the table, and wherein the bed is composed of a bottom and a pair of upright walls rising at sidewise opposing sides of the bottom and extending along the moving direction of the table, and the magnet yoke is arranged such that any one of the confronting sections is mounted on the bottom while another of the confronting sections is spaced apart in substantially parallel with the bottom, with the connecting section extending in perpendicular to opposing surfaces of the confronting sections.

2. A slider unit constructed as recited in claim 1, wherein the connecting section is formed integrally with the confronting sections.

3. A slider unit constructed as recited in claim 2, wherein both the table and the bed are made of aluminum alloys.

4. A slider unit constructed as recited in claim 1, wherein the table is arranged on the bed for sliding movement with respect to the bed through the linear motion guide units, which are provided on top faces of the upright walls.

5. A slider unit constructed as recited in claim 1, wherein there is provided detecting means to monitor positions of the table relative to the bed, the detecting means being installed inside any one of the upright walls of the bed, which is near the sidewise opening of the magnet yoke.

6. A slider unit constructed as recited in claim 5, wherein the detecting means is comprised of a linear scale attached lengthwise on an inside surface of the upright wall nearby the sidewise opening of the magnet yoke, and a sensor head provided inside the table to detect the linear scale.

7. A slider unit constructed as recited in claim 6, wherein the detecting means is of optical type in which the linear scale is a photo-linear scale and the sensor head is an optical sensor head.

8. A slider unit constructed as recited in claim 6, wherein the table is made therein with a port to permit access to the sensor head.

9. A slider unit constructed as recited in claim 1, wherein a plurality of the tables is arranged to a single bed for sliding movement.

10. A slider unit constructed as recited in claim 9, wherein the adjoining tables has the stoppers of elastic material on their ends facing at least one moving direction of the tables, in order to buff impact of collision between the adjoining tables.

11. A slider unit with a built-in moving coil linear motor, comprising
   a bed supporting thereon a magnet yoke, a table movable through linear motion guide units in a sliding manner with respect to the bed,
   end plates mounted to lengthwise opposing ends of the bed, each to each end,
   a pair of field magnets arranged on inwardly confronting surfaces of the magnet yoke in such a manner that poles on the field magnets alternate in polarity along a moving direction of the table and also unlike poles confront each other across an air gap between the field magnets, and
   a moving-coil assembly mounted to the table and provided with armature coils arranged in the air gap,
   wherein the moving-coil assembly moves together with the table by virtue of electromagnetic interaction of magnetic flux of the field magnets with current flowing in the armature coils,
   the magnet yoke is composed of a pair of confronting sections having thereon the field magnets, each to each section,
   a connecting section to join the confronting sections to each other at their lengthwise edges extending along the moving direction of the table, the moving-coil assembly extends into the air gap, with passing through a sidewise opening formed at another edges of the confronting sections extending along the moving direction of the table, and
   wherein any one of the confronting sections of the magnet yoke, which is near the table, is attached to the bed, while another of the confronting sections is provided by a part of the bed and the connecting section is provided by a part of the former one of the confronting sections and a part of the bed.

12. A slider unit constructed as recited in claim 11, wherein the table is made of aluminum alloys, whereas the bed is made of magnetic material.

13. A slider unit constructed as recited in claim 11, wherein the bed is composed of a bottom and a pair of upright walls rising at sidewise opposing sides of the bottom and extending along the moving direction of the table, and the former one of the confronting sections and the connecting section are provided by a part of the bottom and any one of the upright walls, while another of the confronting sections of the magnet yoke is arranged in substantially parallel with the bottom.

14. A slider unit with a built-in moving coil linear motor, comprising
   a bed supporting thereon a magnet yoke, a table movable through linear motion guide units in a sliding manner with respect to the bed,
   end plates mounted to lengthwise opposing ends of the bed, each to each end,
   a pair of field magnets arranged on inwardly confronting surfaces of the magnet yoke in such a manner that poles on the field magnets alternate in polarity along a moving direction of the table and also unlike poles confront each other across an air gap between the field magnets, and
   a moving-coil assembly mounted to the table and provided with armature coils arranged in the air gap,
   wherein the moving-coil assembly moves together with the table by virtue of electromagnetic interaction of magnetic flux of the field magnets with current flowing in the armature coils,
   the magnet yoke is composed of a pair of confronting sections having thereon the field magnets, each to each section,
   a connecting section to join the confronting sections to each other at their lengthwise edges extending along the moving direction of the table,
   the moving-coil assembly extends into the air gap, with passing through a sidewise opening formed at another edges of the confronting sections extending along the moving direction of the table, and wherein the moving-coil assembly has a coil board attached to the table and extending into the air gap between the field magnets, and the armature coils are a plurality of flat polyphase structures arranged on any one surface of the coil board in juxtaposition along the moving direction of the table.

15. A slider unit constructed as recited in claim 14, wherein the armature coils are made with convexities while the coil board has recesses complementary to the convexities, so that the armature coils are fixed to the coil board with adhesive, with the convexities fitting in the associated recesses.

16. A slider unit constructed as recited in claim 14, wherein each armature coil comprises a core member of molded resinous material, and winding turns looped around the core member in the form of flat rectangular solid.

17. A slider unit with a built-in moving coil linear motor, comprising
   a bed supporting thereon a magnet yoke, a table movable through linear motion guide units in a sliding manner with respect to the bed,
   end plates mounted to lengthwise opposing ends of the bed, each to each end,
   a pair of field magnets arranged on inwardly confronting surfaces of the magnet yoke in such a manner that poles on the field magnets alternate in polarity along a moving direction of the table and also unlike poles confront each other across an air gap between the field magnets, and
   a moving-coil assembly mounted to the table and provided with armature coils arranged in the air gap,
   wherein the moving-coil assembly moves together with the table by virtue of electromagnetic interaction of magnetic flux of the field magnets with current flowing in the armature coils,
   the magnet yoke is composed of a pair of confronting sections having thereon the field magnets, each to each section,
   a connecting section to join the confronting sections to each other at their lengthwise edges extending along the moving direction of the table,
   the moving-coil assembly extends into the air gap, with passing through a sidewise opening formed at another edges of the confronting sections extending along the moving direction of the table, and
   wherein the bed is provided with limiters to define a tolerable range of moving stroke of the table and an origin mark to define a home position of the table, and any one of the table and the moving-coil assembly has a limit sensor to detect the limiters and the origin mark.

18. A slider unit with a built-in moving coil linear motor, comprising a bed supporting thereon a magnet yoke, a table movable through linear motion guide units in a sliding manner with respect to the bed, end plates mounted to lengthwise opposing ends of the bed, each to each end, a pair of field magnets arranged on inwardly confronting surfaces of the magnet yoke in such a manner that poles on the field magnets alternate in polarity along a moving direction of the table and also unlike poles confront each other across an air gap between the field magnets, and a moving-coil assembly mounted to the table and provided with armature coils arranged in the air gap, wherein the moving-coil assembly moves together with the table by virtue of electromagnetic interaction of magnetic flux of the field magnets with current flowing in the armature coils, the magnet yoke is composed of a pair of confronting sections having thereon the field magnets, each to each section, a connecting section to join the confronting sections to each other at their lengthwise edges extending along the moving direction of the table, the moving-coil assembly extends into the air gap, with passing through a sidewise opening formed at another edges of the confronting sections extending along the moving direction of the table, and wherein recesses for manipulation are formed at the outermost end faces of the end plates, thereby making it possible to manually operate the slider unit.

19. A slider unit with a built-in moving coil linear motor, comprising a bed supporting thereon a magnet yoke, a table movable through linear motion guide units in a sliding manner with respect to the bed, end plates mounted to lengthwise opposing ends of the bed, each to each end, a pair of field magnets arranged on inwardly confronting surfaces of the magnet yoke in such a manner that poles on the field magnets alternate in polarity along a moving direction of the table and also unlike poles confront each other across an air gap between the field magnets, and a moving-coil assembly mounted to the table and provided with armature coils arranged in the air gap, wherein the moving-coil assembly moves together with the table by virtue of electromagnetic interaction of magnetic flux of the field magnets with current flowing in the armature coils, the magnet yoke is composed of a pair of confronting sections having thereon the field magnets, each to each section, a connecting section to join the confronting sections to each other at their lengthwise edges extending along the moving direction of the table, the moving-coil assembly extends into the air gap, with passing through a sidewise opening formed at another edges of the confronting sections extending along the moving direction of the table, and wherein stoppers of elastic body are attached to inside surfaces of the end plates to provide buffers for a collision against the table.

* * * * *